United States Patent [19]

Smith et al.

[11] 4,327,294
[45] * Apr. 27, 1982

[54] COMBINED CYCLE ELECTRIC POWER PLANT AND A GAS TURBINE HAVING AN IMPROVED OVERSPEED PROTECTION SYSTEM

[75] Inventors: Jack R. Smith, Pittsburgh; Terry J. Reed, North Huntingdon, both of Pa.

[73] Assignee: Westinghouse Electric Corp., Pittsburgh, Pa.

[*] Notice: The portion of the term of this patent subsequent to Sep. 11, 1996, has been disclaimed.

[21] Appl. No.: 9,013

[22] Filed: Feb. 5, 1979

Related U.S. Application Data

[62] Division of Ser. No. 495,739, Aug. 8, 1974, Pat. No. 4,167,096.

[51] Int. Cl.³ .............................................. F02C 9/28
[52] U.S. Cl. .............................. 290/40 C; 60/39.28 R
[58] Field of Search .................... 60/646, 39.28 R; 290/40 C

[56] References Cited

U.S. PATENT DOCUMENTS

| | | | |
|---|---|---|---|
| 3,243,596 | 3/1966 | Loft | 60/39.28 R |
| 3,255,586 | 6/1966 | Hennig | 60/39.28 R |
| 3,421,317 | 1/1969 | Bedford | 60/39.28 R |
| 3,469,395 | 9/1969 | Spitsbergen | 60/39.28 R |
| 3,686,860 | 8/1972 | White | 60/39.28 R |

Primary Examiner—J. V. Truhe
Assistant Examiner—Shelley Wade
Attorney, Agent, or Firm—E. F. Possessky

[57] ABSTRACT

A combined cycle electric power plant includes gas and steam turbines and steam generators and a digital-/analog control system. In the automatic and manual modes of operation, the control system develops a fuel reference signal for the throttle valve position control by means of a speed/load control which functions on a feedforward speed control basis without speed feedback correction. An electrical overspeed protection control is directly coupled to the throttle valve position control to limit turbine speed to a first reference value when the breaker is closed and to limit turbine speed to a lower reference value when the breaker is open. Electrical and mechanical overspeed protection systems directly trip the turbine at higher speed references.

6 Claims, 28 Drawing Figures

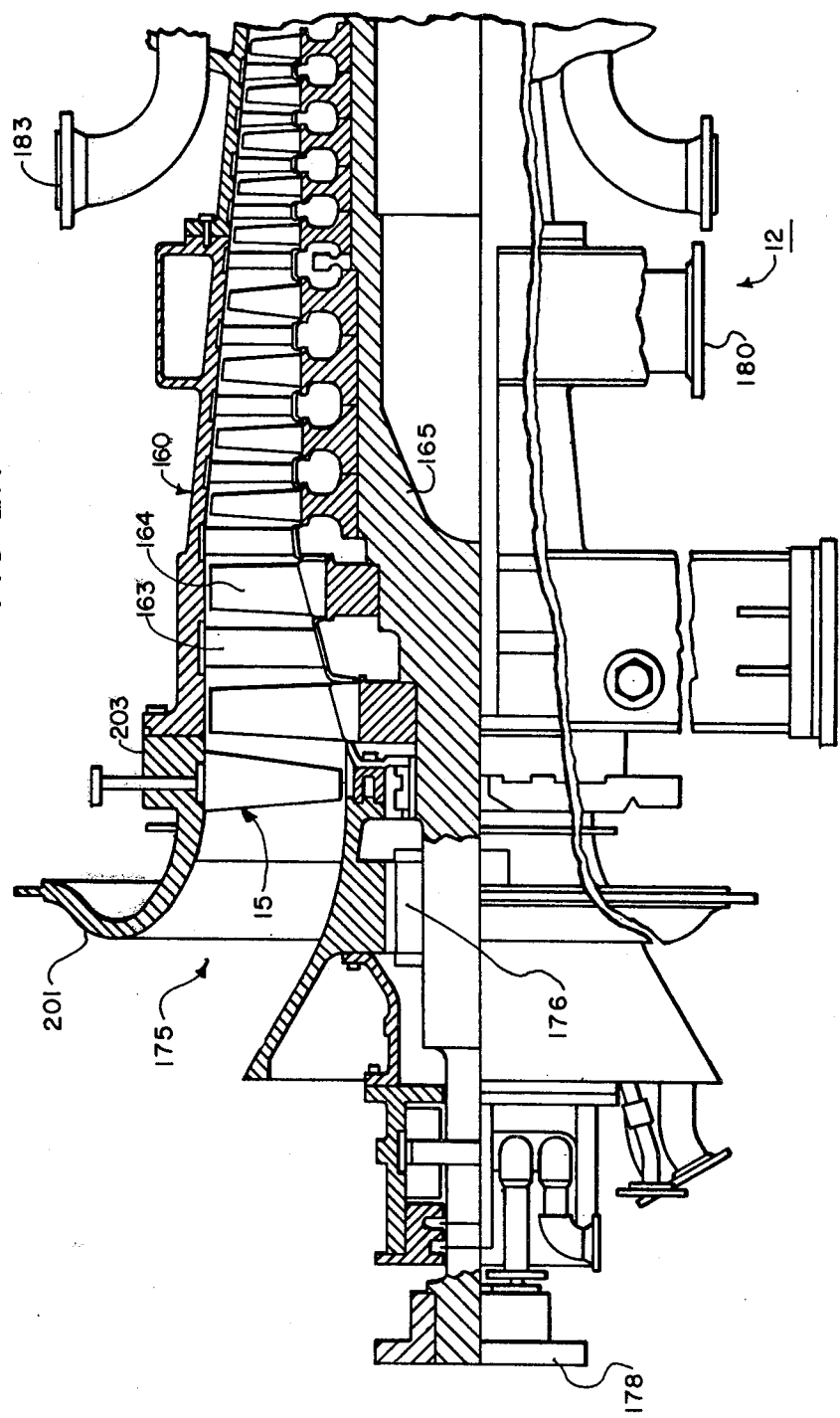

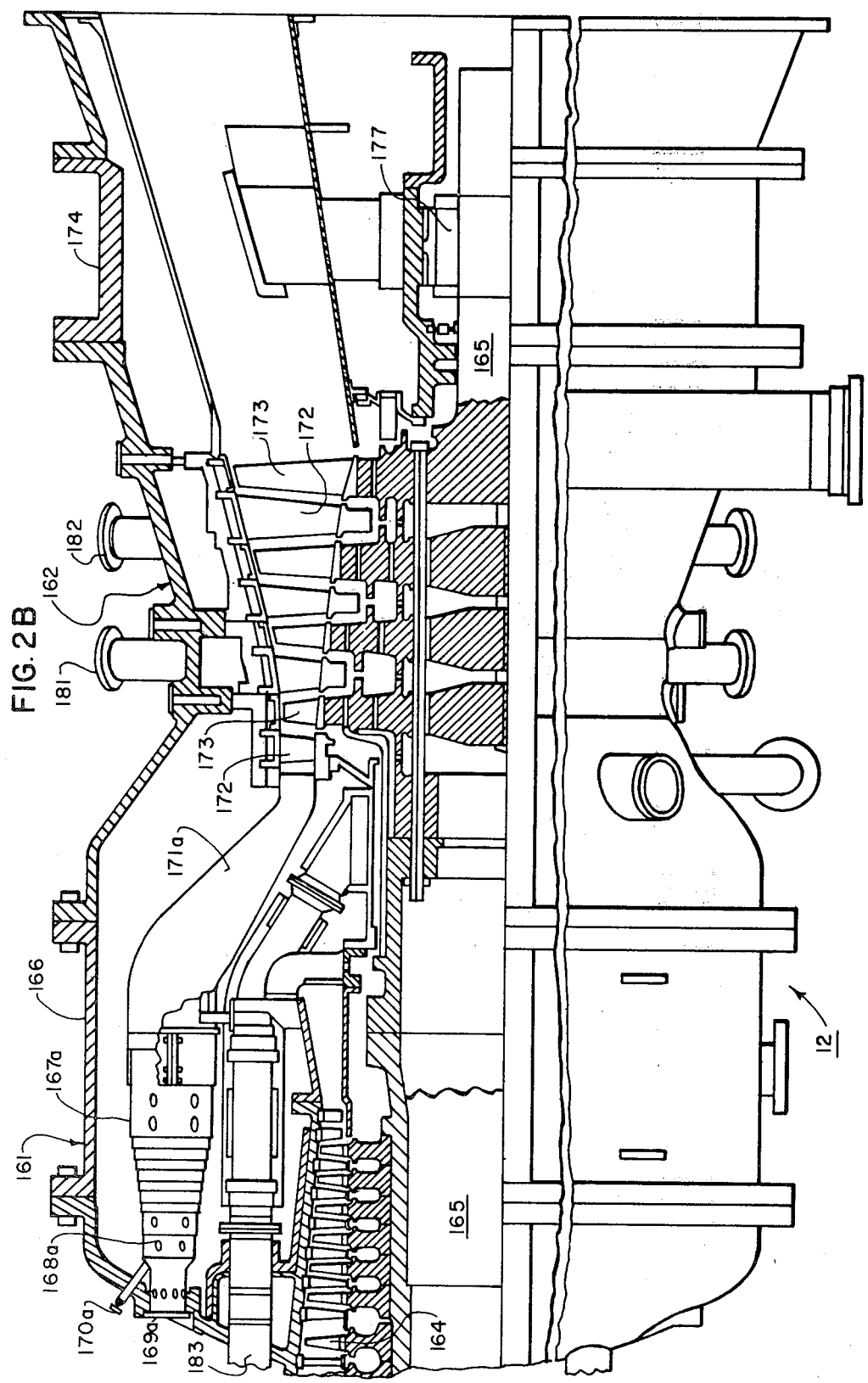

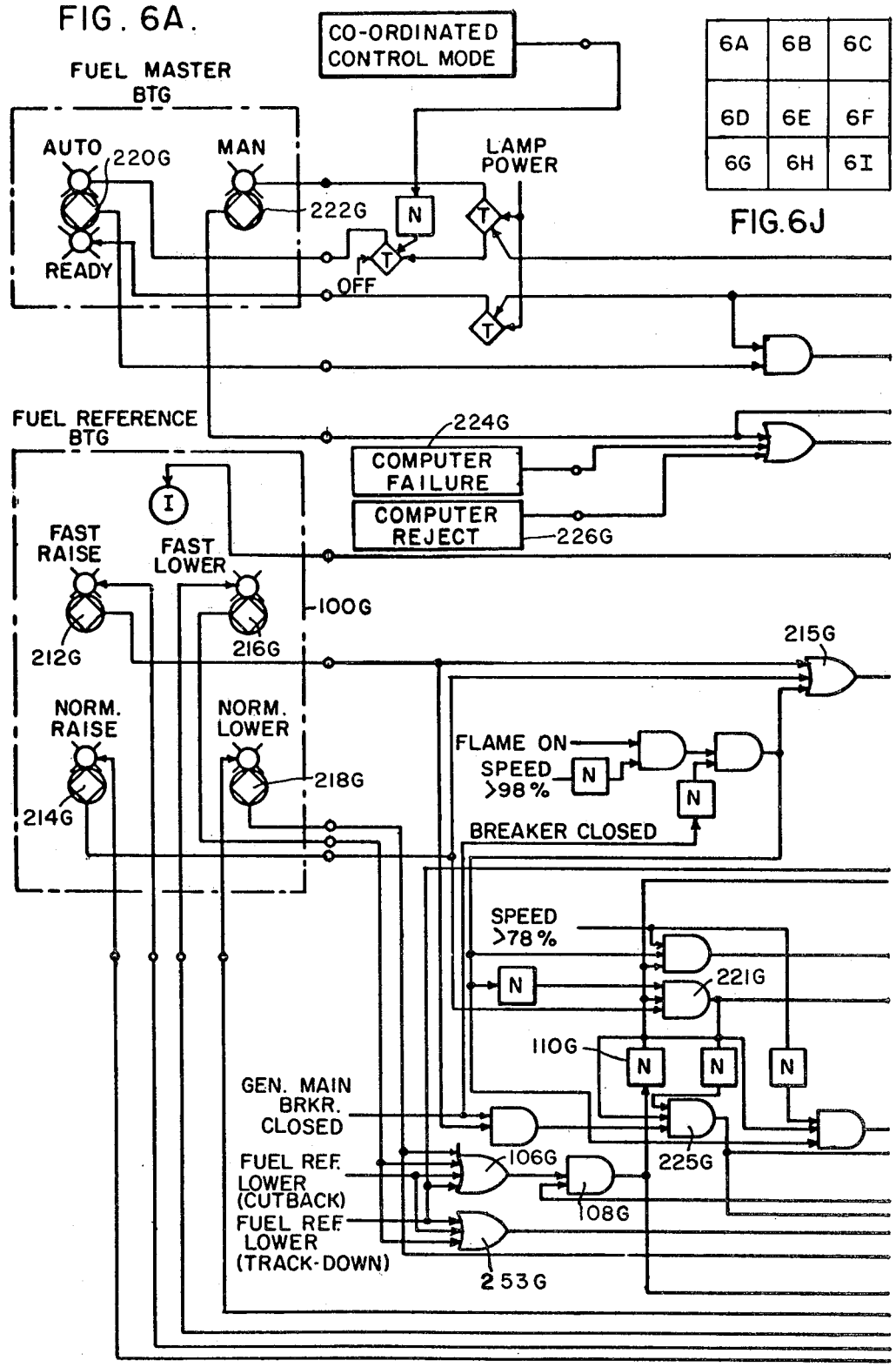

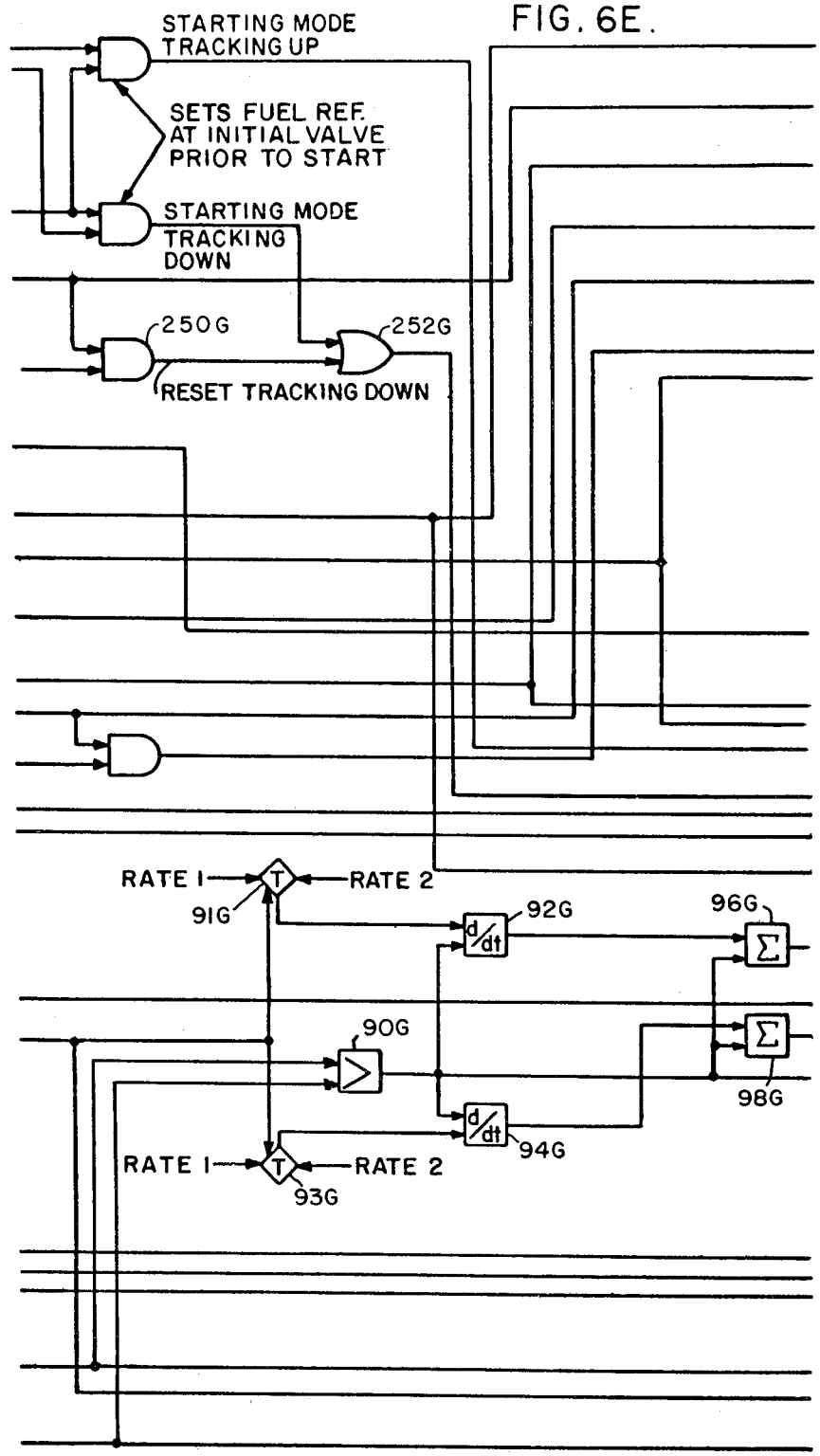

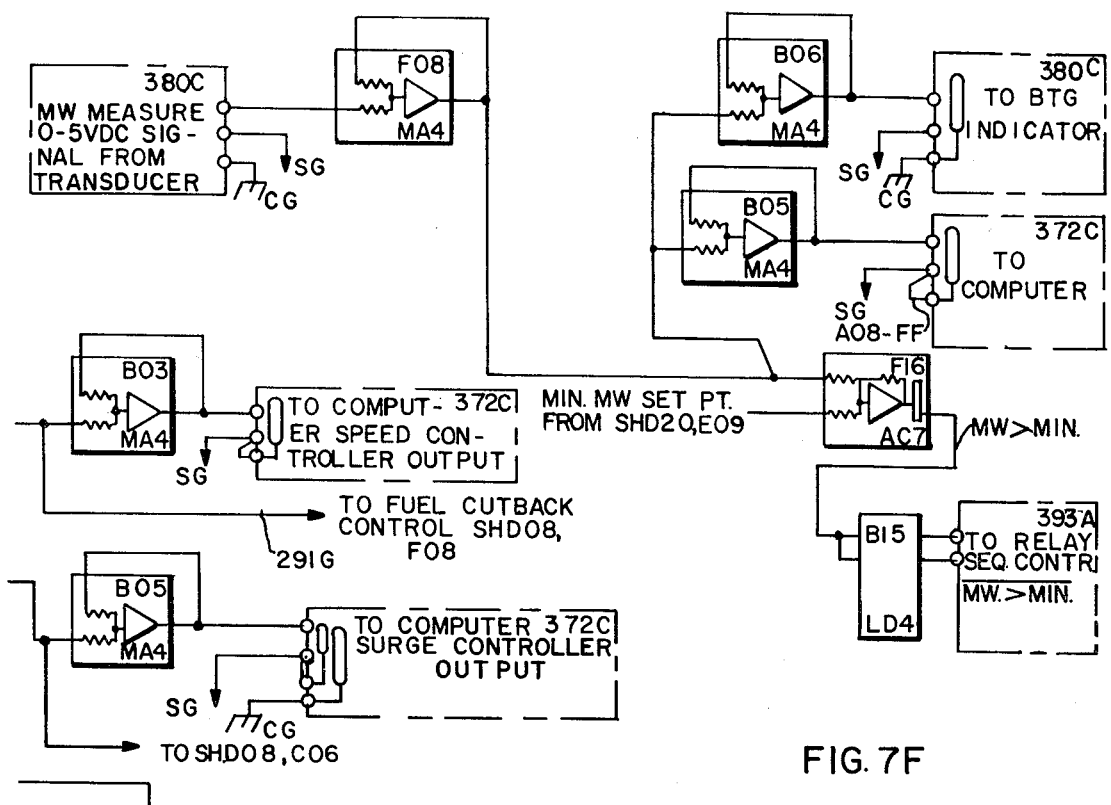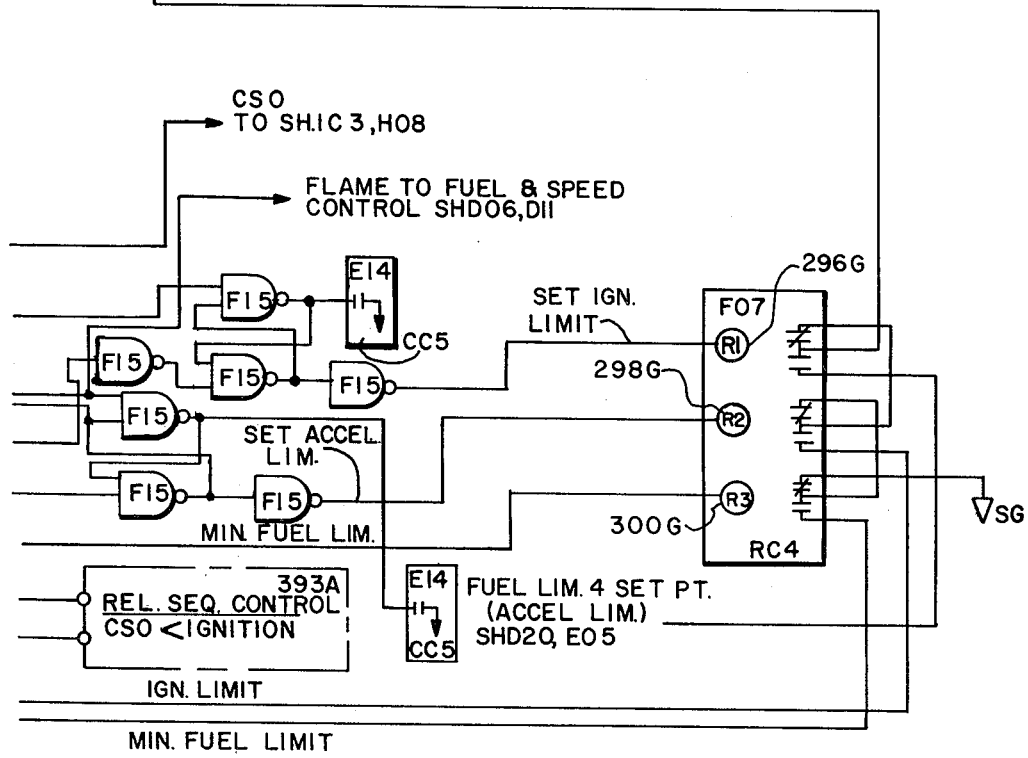
FIG. 7F

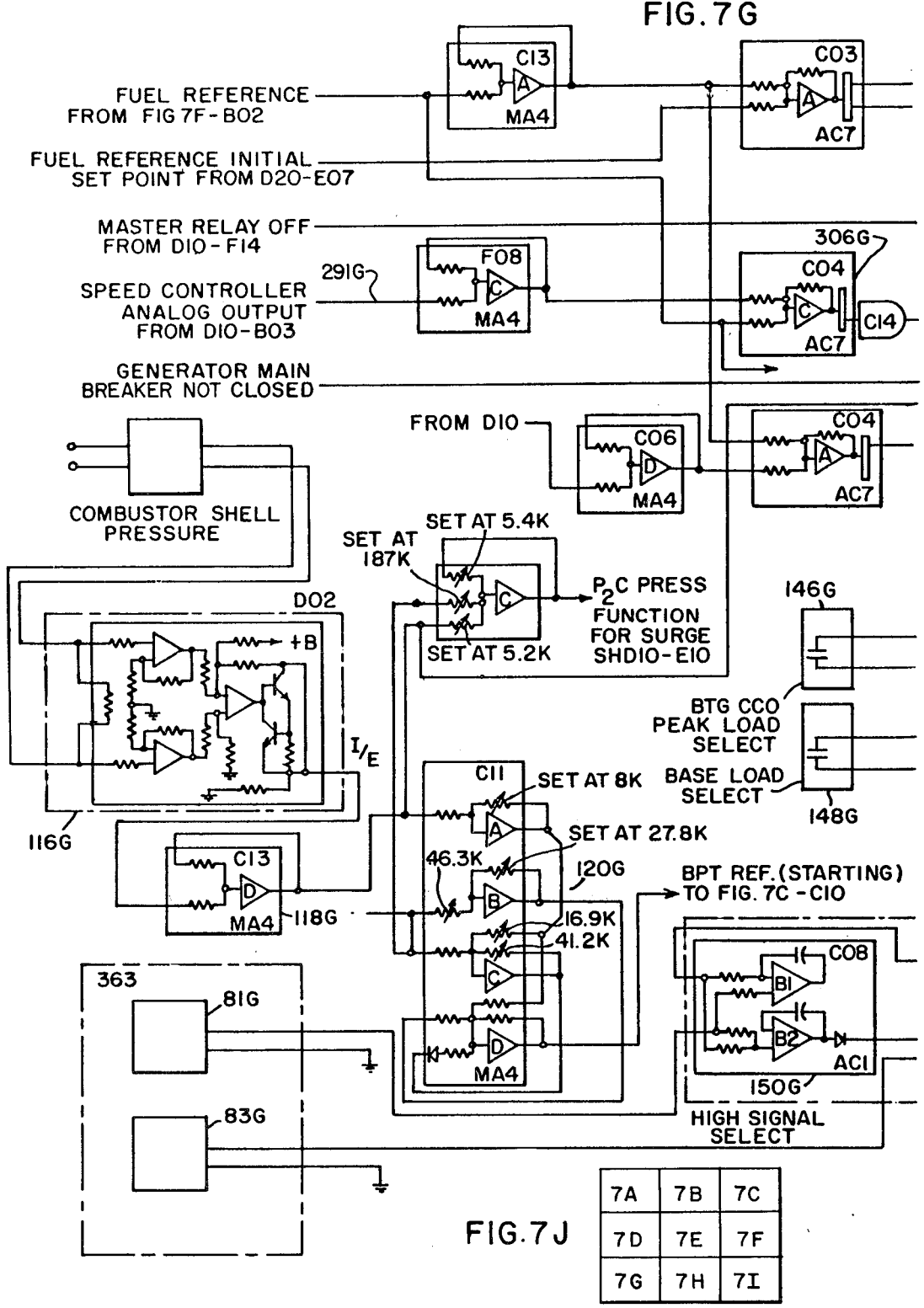

COMBINED CYCLE ELECTRIC POWER PLANT AND A GAS TURBINE HAVING AN IMPROVED OVERSPEED PROTECTION SYSTEM

This is a division of application Ser. No. 495,739, filed Aug. 8, 1974, now U.S. Pat. No. 4,167,096.

CROSS-REFERENCE TO RELATED APPLICATIONS

Reference is made to the following patent applications:

1. Ser. No. 399,790, filed on Sept. 21, 1973 by L. F. Martz, R. W. Kiscaden and R. Uram, entitled "An Improved Gas Turbine And Steam Turbine Combined Cycle Electric Power Generating Plant Having A Coordinated And Hybridized Control System And An Improved Factory Based Method For Making And Testing Combined Cycle And Other Power Plants And Control Systems Therefor", assigned to the present assignee and hereby incorporated by reference.

2. Ser. No. 319,114, filed by T. Giras and J. Reuther on Dec. 29, 1972 as a continuation of an earlier filed application Ser. No. 082,470, entitled "An Improved System And Method For Operating Industrial Gas Turbine Apparatus And Gas Turbine Electric Power Plants Preferably With A Digital Computer Control System" and assigned to the present assignee, and related cases referred to therein.

3. Ser. No. 371,625, filed on June 20, 1973 by R. Yannone and R. A. Shields, entitled "Gas Turbine Power Plant Control Apparatus Having A Multiple Backup Control System", and assigned to the present assignee, and related cases referred to therein.

4. Ser. No. 495,765, filed concurrently herewith by Lyle F. Martz and Richard J. Plotnick, entitled "Combined Cycle Electric Power Plant Having A Control System Which Enables Dry Steam Generator Operation During Gas Turbine Operation", assigned to the present assignee and hereby incorporated by reference.

BACKGROUND OF THE INVENTION

The present invention relates to combined cycle electric power plants and more particularly to improved gas turbine overspeed protection controls especially useful in the operation of gas turbines in combined cycle electric power plants.

In the operation of gas turbines in electric power plants, it is necessary to protect the turbine structure reliably from damage that could result from overspeed. Typically, if the speed of a power plant gas turbine reaches a predetermined overspeed value such as 111% of rated speed, an overspeed trip mechanism causes fuel shutoff to shut down the turbine with resultant loss of generation capacity. Such a trip mechanism can include for example apparatus which detects overspeed by some mechanical means and then causes the closure of an overspeed trip valve in the fuel line which supplies fuel to the nozzles in the turbine combustors. It could further include control circuitry which generates an electric signal to cause the valve position control to close the isolation valve and trip the turbine if the turbine speed exceeds some speed slightly below the mechanical overspeed setpoint.

When the turbine is shut down, it cannot normally be restarted until after it has coasted to a complete stop. The shut down and restarting process typically takes about 30 minutes or more and it is therefore undesirable to allow the turbine to reach the trip level unless there is a serious malfunction which renders a shut down mandatory to prevent serious damage to the turbine. It has therefore also been customary to provide electrical overspeed protection through the throttle valve fuel control so as to hold the turbine at some lower overspeed value such as 104% rated speed during power system overspeed conditions or during isolated operation of the gas turbine.

During gas turbine startup, fuel flow is typically controlled by a startup control which either directly controls speed or indirectly controls speed by controlling fuel flow to satisfy an acceleration control, an exhaust temperature limit control, and/or a surge limit control. During electrical load operation, fuel flow can be controlled to generate a particular load under load control within exhaust temperature limits, or to gain the advantage of higher heat rates the fuel can be controlled by a temperature limit control to produce turbine operation at the maximum load level permitted by the blade path or exhaust temperature limit. The speed and load controls are generally channeled together where both are provided to form a speed/load control, and temperature limit and other constraint controls are channeled into the speed/load control so that the lowest control signal operates as a fuel demand on an electropneumatic control which positions the fuel throttle valve. The control may be the relay-pneumatic type, the electronic analog type or a digital/analog hybrid type. Reference is made for example to U.S. Pat. No. 3,520,133 issued to A. Loft on July 14, 1970 where typical electronic control apparatus is described.

To obtain first level electrical overspeed protection, the speed control loop can be employed if it is provided, i.e. once the breaker opens during the load mode, the speed control cuts back on the fuel demand by the operation of the speed control loop through the speed/load control, or during power system overspeed in the load mode the speed/load control similarly cuts back on the fuel demand. Turbine overspeed protection obtained by normal functioning of the speed/load control, such as that associated with the gas turbine computer control system disclosed in the above referenced Ser. No. 319,114, provides advantages over the case of overspeed protection by direct mechanical and/or electrical trip alone since costly shut downs and temporary loss of generation capacity are avoided in situations where generation shut downs are unnecessary, but overspeed protection through the speed/load control does have a response time associated with it due to the operation of included transfer functions in the speed control loop with or without a speed reference change for the speed control loop upon a switch from the load control mode to the speed control mode. That response time causes an undesirable bump in turbine response just after the breaker opens, i.e. when the load is dumped the turbine speeds up as the fuel flow is controllably reduced by the reaction of the speed/load control.

In prior steam turbine overspeed protection systems, electrical overspeed protection systems may have been employed independently of speed/load control and independently of the mechanical or electrical overspeed trips to achieve an electrical cutback in turbine energization under a first range of overspeed conditions and to achieve a mechanical or electrical trip of the steam turbine at upper limiting overspeed conditions. However, the prior steam turbine control art provides no disclosure on how the principles of independent electrical overspeed protection can be beneficially applied to combinations of gas turbine control system elements.

In combined cycle electric power plants, gas turbine overspeed protection is especially important if the plant is designed to function without system frequency participation. In that event, unnecessary gas turbine trips are desirably avoided on the electrical isolation of the combined cycle plant since substantial generation capacity represented by the rest of the plant can otherwise be lost by plant shut down. Thus, there is a need for improved gas turbine electrical overspeed protection, especially where gas turbines operate with other apparatus in combined cycle plants.

The description of prior art herein is made on good faith and no representation is made that any prior art considered is the best pertaining prior art nor that the interpretation placed on it is unrebuttable.

SUMMARY OF THE INVENTION

A gas turbine or combined cycle electric power plant includes turbine and generator apparatus and a control system having a speed/load control and an overspeed protection limit control which are coupled to a turbine fuel or valve position control to control the turbine operating level. Electrical and mechanical overspeed protection systems trip the turbine if the turbine speed exceeds a first value and the overspeed protection control functions electrically to limit the turbine fuel flow for the purpose of normally limiting the turbine speed to some lower speed value. The speed/load control preferably functions as a feedforward controller without speed feedback correction and the overspeed protection control preferably is directly coupled to the turbine fuel control to achieve fast electrical overspeed protection and reduced cycling of the gas turbine and the combined cycle power plant operation.

BRIEF DESCRIPTION OF THE DRAWINGS

FIGS. 2A and 2B show a longitudinal section of a gas turbine structure which can be employed in the plant of FIG. 1;

FIGS. 6A through 6I show a more detailed functional diagram of the temperature limit control and FIG. 6J shows how these Figures are tied together;

FIGS. 7A through 7I show circuitry which can be employed to embody various functional blocks in FIGS. 6A through 6I and FIG. 7J shows how these Figures are tied together.

DESCRIPTION OF THE PREFERRED EMBODIMENT

A. General Plant Description

Figure 1:
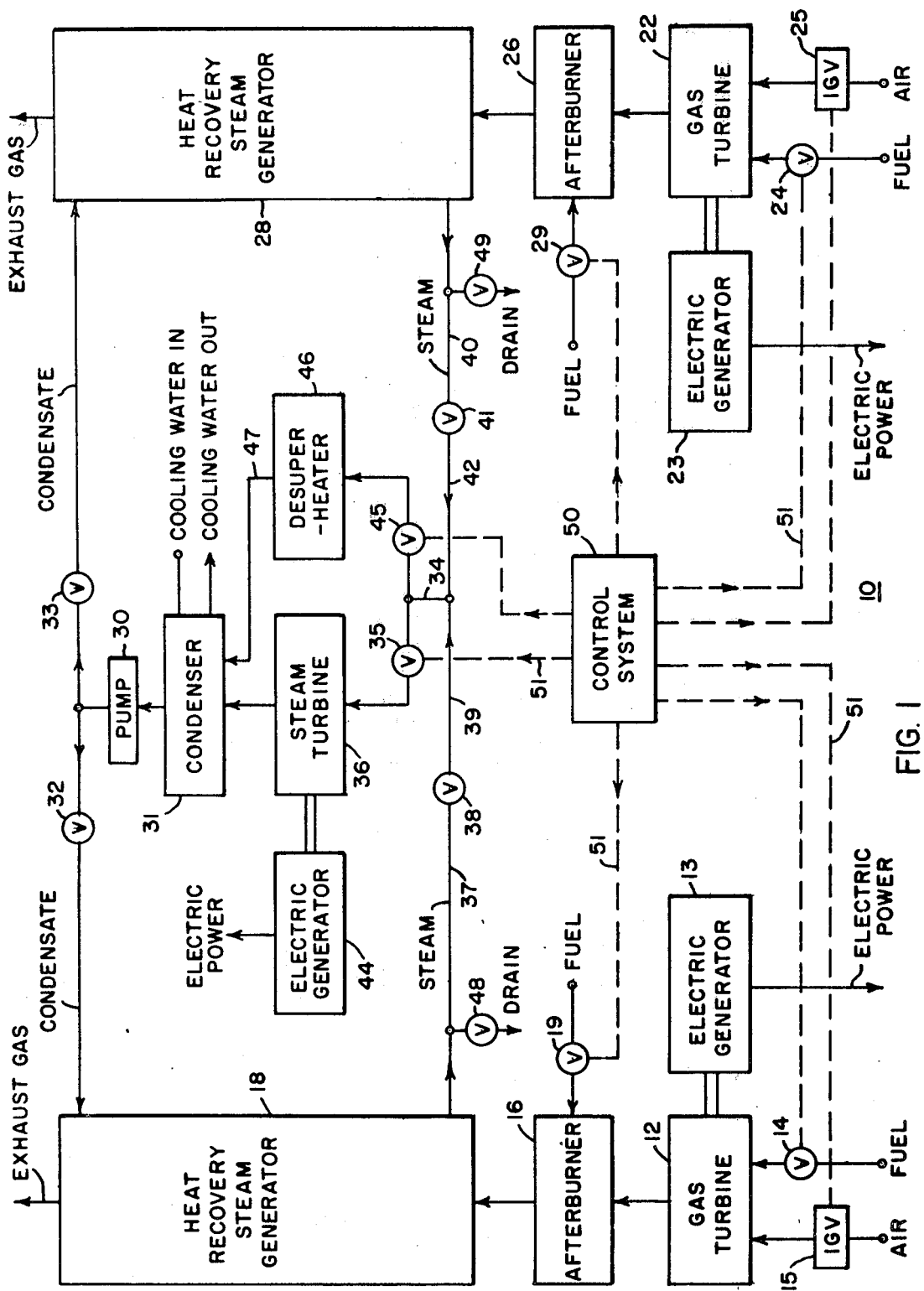
FIG. 1 shows a schematic view of a combined cycle electric power plant in which there is employed a gas turbine in accordance with the principles of the invention.

Referring to FIG. 1 of the drawings, there is shown a functional block diagram of a representative embodiment of a combined cycle electric power generating plant constructed in accordance with the present invention. Reference numeral 10 is used to identify the combined cycle plant as a whole. As such, the plant 10 includes a first gas turbine 12 (sometimes referred to as "gas turbine No. 1") which drives a first electric generator 13. Fuel is supplied to the gas turbine 12 by way of a fuel control valve or throttle valve 14. Air enters the gas turbine 12 by way of a variable inlet guide vane mechanism 15 which controls the degree of opening of the turbine air intake and which is used to adjust air flow during the startup phase and to increase part load efficiency. The fuel supplied by the throttle valve 14 is burned in the gas turbine 12 and the resulting high temperature exhaust gas is passed through an afterburner 16 and a heat recovery steam generator 18 and is thereafter exhausted into the atmosphere.

Heat recovery steam generator 18 (sometimes referred to as "heat recovery steam generator No. 1") includes therein various sets of boiler tubes which are heated to a relatively high temperature by the gas turbine exhaust gas passing through the steam generator 18. Afterburner 16 includes a burner mechanism for further increasing the temperature of the gas turbine exhaust gas before it enters the steam generator 18. Fuel is supplied to the burner mechanism in the afterburner 16 by way of a fuel control valve or throttle valve 19. The primary heat source for the steam generator 18 is the gas turbine 12, the afterburner 16 being in the nature of a supplemental heat source for providing supplemental heat when needed. In terms of typical fuel usage, approximately 80% of the fuel is used in the gas turbine 12 and 20% is used in the afterburner 16.

The combined cycle plant 10 further includes a second gas turbine 22 (sometimes referred to as "gas turbine No. 2") which drives a second electric generator 23. Fuel is supplied to the gas turbine 22 by way of a fuel control valve or throttle valve 24. Air enters the gas turbine 22 by way of a variable inlet guide vane mechanism 25 which is used to adjust air flow during turbine startup and to increase part load efficiency. The fuel supplied by throttle valve 24 is burned in the gas turbine 22 and the resulting high temperature exhaust gas is passed through an afterburner 26 and a heat recovery steam generator 28 and is thereafter exhausted into the atmosphere.

Heat recovery steam generator 28 (sometimes referred to as "heat recovery steam generator No. 2") includes various sets of boiler tubes which are heated to a relatively high temperature by the gas turbine exhaust gas passing through the steam generator 28. Afterburner 26 includes a burner mechanism for further increasing the temperature of the gas turbine exhaust gas before it enters the steam generator 28. Fuel is supplied to the burner mechanism in the afterburner 26 by way of a fuel control valve or throttle valve 29. The primary heat source for the steam generator 28 is the gas turbine 22, the afterburner 26 being in the nature of a supplemental heat source for providing supplemental heating when needed. In terms of typical total fuel consumption, approximately 80% of the fuel is used in the gas turbine 22 and 20% is used in the afterburner 26.

A condensate pump 30 pumps water or condensate from a steam condenser 31 to both of the steam generators 18 and 28, the condensate flowing to the first steam generator 18 by way of a condensate flow control valve 32 and to the second steam generator 28 by way of a condensate flow control flow valve 33. Such condensate flows through the boiler tubes in each of the steam generators 18 and 28 and is converted into superheated steam. The superheated steam from both of the steam generators 18 and 28 is supplied by way of a common header or steam pipe 34 and a steam throttle valve or control valve 35 to a steam turbine 36 for purposes of driving such steam turbine 36. The steam from the first steam generator 18 flows to the header 34 by way of a steam pipe 37, an isolation valve 38 and a steam pipe 39, while steam from the second steam generator 28 flows to the header 34 by way of a steam pipe 40, an isolation valve 41 and a steam pipe 42.

The spent steam leaving steam turbine 36 is passed to the condenser 31 wherein it is condensed or converted back into condensate. Such condensate is thereafter pumped back into the steam generators 18 and 28 to make more steam. Steam turbine 36 drives a third electric generator 44.

A steam bypass path is provided for use at appropriate times for diverting desired amounts of steam around the steam turbine 36. This steam bypass path includes a steam turbine bypass valve 45 and a desuperheater 46, the output side of the latter being connected to the condenser 31 by way of a pipe 47. A drain valve 48 is provided for the first steam generator 18, while a drain valve 49 is provided for the second steam generator 28.

The operation of the combined cycle electric power generator plant 10 is controlled by a control system 50, typical control signal lines 51 being shown in a broken line manner. As will be seen, the control system 50 offers a choice of four different control operating levels providing four different degrees of automation. From highest to lowest in terms of the degree of automation, these control operating levels are: (1) plant coordinated control; (2) operator automatic control; (3) operator analog control; and (4) manual control. The control system 50 includes an analog control system which is constructed to provide complete and safe operation of the total plant 10 or any part thereof. The control system 50 also includes a digital computer that provides a real-time digital control system that works in conjunction with the analog control system at the higher two levels of control to coordinate and direct the operation of the analog control system. Failure of the digital control computer results in no loss of power generation because the analog control system provides for complete operation of the plant 10.

When operating at the highest level of control, namely, at the plant coordinated control level, the control system 50, among other things, automatically coordinates the settings of the fuel valves 14, 19, 24 and 29, the inlet guide vanes 15 and 25 and the steam turbine throttle and bypass valves 35 and 45 to provide maximum plant efficiency under static load conditions and optimum performance during dynamic or changing load conditions.

The control system 50 also enables a coordinated automatic startup or shutdown of the plant 10 such that the plant 10 can be brought from a hot standby condition to a power generating condition or vice versa in a quick, efficient and completely automatic manner. For example, the entire plant 10 can be started and brought to full load from a hot standby condition in approximately 60 minutes time by having the plant operator simply dial in the desired load setting and push a master plant start button.

As an indication of the flexibility and reliability of the power generating plant 10, it is noted that the plant 10 can be operated in any one of the following configurations: (1) using one steam turbine and two gas turbines; (2) using one steam turbine and one gas turbine; (3) using two gas turbines only; and (4) using one gas turbine only. The steam turbine 36 will, of course, not operate by itself, it being necessary to use at least one of the gas turbines 12 and 22 in order to use the steam turbine 36. In order to obtain the benefits of combined cycle operation, it is, of course, necessary to use the steam turbine 36 and at least one of the gas turbines 12 and 22. When one of the gas turbines, for example the gas turbine 12, is not being used or is shut down for maintenance purposes, then its associated steam generator 18 can be removed from the system by closing its condensate flow valve 32 and its steam isolation valve 38. When, on the other hand, the steam turbine 36 is not being used or is shut down for maintenance purposes, the steam generated by the steam generators 18 and 28 can be bypassed to the condenser 31 by way of steam bypass valve 45 and the desuperheater 46. As an alternative, when the steam turbine 36 is not being used, either one or both of the steam generators 18 and 28 can be drained and vented by the appropriate setting of condensate valves 32 and 33, steam isolation valves 38 and 41 and drain valves 48 and 49. In other words, each of the steam generators 18 and 28 is constructed so that its respective gas turbine can be operated with the steam generator in a dry condition.

The combined cycle plant 10 affords a high degree of reliability in that failure of any one of the major apparatus components will not reduce total plant power generation capacity by more than 50%. In this regard and by way of example only, a combined cycle plant 10 has been developed having a nominal maximum power generating capacity of 260 megawatts. In such plant, each of the gas turbines 12 and 22 is capable of producing a maximum of approximately 80 megawatts of electrical power under ISO conditions (59° Fahrenheit at sea level) and the steam turbine 36 is capable of producing a maximum of approximately 100 megawatts of electrical power. Thus, loss of any one of the turbines 12, 22 and 36, for example, would not reduce total plant capacity by as much as 50%.

It is noted in passing that the functional block diagram of FIG. 1 has been simplified in some respects relative to the actual plant apparatus to be described hereinafter, this simplification being made to facilitate an initial overall understanding of the combined cycle plant 10. A major simplification in FIG. 1 concerns the fuel valves 14, 19, 24, and 29. As will be seen in the actual embodiment of the combined cycle plant described herein, provision is made for operating the gas turbines 12 and 22 and the afterburners 16 and 26 on either of two different kinds of fuel, namely, either natural gas or distillate type fuel oil. As a consequence, each of the gas turbines 12 and 22 and each of the afterburners 16 and 26 is actually provided with two fuel throttle valves, one for natural gas and the other for fuel oil. Also, various other valves and devices employed in the actual fuel supply systems have been omitted from FIG. 1 for the sake of simplicity. Other simplifications employed in FIG. 1 are of a similar character.

B. Gas Turbine Mechanical Structure

Referring now to FIGS. 2A and 2B, there is shown a longitudinal, partially cross-sectional, elevational view of the No. 1 gas turbine 12. FIG 2A shows the left-hand half of the view and FIG. 2B shows the right-hand half of the view. The No. 2 gas turbine 22 is of this same construction and whatever is said concerning the construction of the No. 1 gas turbine 12 also applies to the No. 2 gas turbine 22. With this in mind, the gas turbine 12 is a W-501 gas turbine manufactured by Westinghouse Electric Corporation, Gas Turbine Systems Division, Lester, Pa. It is of the simple open cycle type and employs a single-shaft two-bearing construction in which no bearings are located in a high pressure, high temperature zone. It is constructed for operation at a rated speed of 3,600 rpm and is capable of driving an electric generator for producing in excess of 80 megawatts of electrical power. It includes an axial flow air compressor section 160, a combustion section 161 and a turbine section 162. The compressor section or compressor 160 is comprised of interspersed sets of stationary blades 163 and rotary blades 164, the latter being located on a rotor structure 165 which extends substantially the entire length of the gas turbine 12.

The combustion section 161 includes a combustor housing or combustor shell 166 which receives the compressed air from the compressor 160. Located in the combustor shell 166 is a set of 16 combustion chambers or combustors, one of which is indicated at 167a. These combustors 167a–167p are arranged in an evenly spaced concentric manner around the longitudinal center axis of the gas turbine 12. Considering in detail only the combustor 167a, compressed air enters the interior thereof by multiple ports 168a. Fuel enters the combustor 167a by way of a fuel nozzle 169a, a spark plug 170a serving to provide for the initial ignition of the fuel. This fuel is burned in the combustor 167a and the resulting high temperature, high pressure gas is supplied by way of a combustor outlet duct 171a to the inlet of the turbine section 162.

The turbine section 162 is a four stage turbine having interspersed sets of stationary blades 172 and rotary blades 173, the latter being located on the rotor structure 165. The high temperature high pressure gas from all of the combustors 167a–167p enters the turbine section 162 and expands through the turbine blades 172 and 173 to cause rotation of the rotary blades 173 and thereby drive the rotary blades 164 of the compressor 160 on the same rotor structure 165. The hot exhaust gas leaving the turbine section 162 exhausts axially by way of an exhaust duct 174 from whence it flows into the inlet duct for the heat recovery steam generator 18.

The variable inlet guide vane mechanism 15 is located just inside the air intake structure 175 of the compressor section 160, just ahead of the first set of compressor blades 163 and 164. The inlet guide vanes 15 are used to adjust the compressor air flow during the starting cycle and to increase part load efficiency.

The two bearings which support the single rotor structure 165 of the gas turbine 12 are indicated at 176 and 177. As seen, these bearings 176 and 177 are located outside of any high pressure high temperature zone. The electric generator 13 is coupled to the cold or compressor end 178 of the rotor structure 165 to avoid potential misalignment problems. Some air is removed from the compressor 160 by way of outlet 180, externally cooled and filtered by an air cooler and returned to the turbine section 162 to cool the first two sets of stationary blades 172 and the first set of rotary blades 173. The cooling air for the stationary blades 172 enters through inlets 181 and 182, while the cooling air for the first set of rotary blades 173 enters via inlet 183.

For more detail on the structure of other apparatus in the plant 10, reference is made to Ser. No. 495,765.

C. Plant Control System

The plant control system 50 is organized to operate the plant equipment safely through startup and loading with high reliability so that the plant is highly and quickly available to meet power demanded from it. To achieve this purpose, the plant control system is preferably embodied in digital/analog hybrid form, and the digital/analog interface is preferably disposed in a way that plant protection and plant availability are enhanced.

Generally, the total plant power is controlled by controlling the operating level of the turbines and the afterburners, but the steam turbine goes into a follow mode of operation once the steam bypass valves are closed and the steam turbine inlet valves are fully opened. In the follow mode, the steam turbine produces power at a level dependent on the steam conditions generated by the heat inputs to the steam generators.

Figure 3:
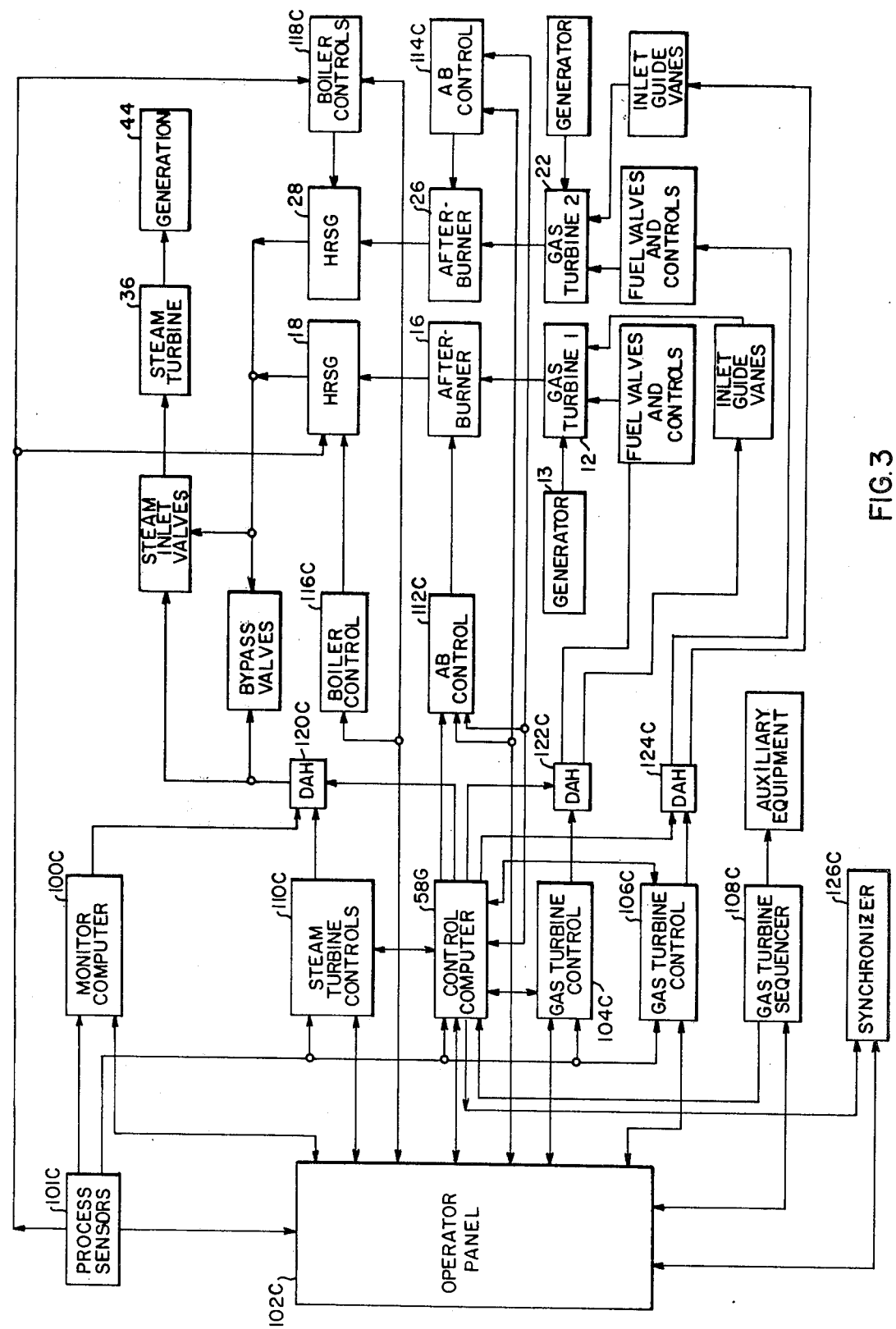
FIG. 3 shows a schematic view of a control system arranged to operate the plant of FIG. 1 in accordance with the principles of the invention.

As shown in FIG. 3, the control system 50 includes a digital control computer 58G, a digital monitor computer 100C and vairous analog controls for operating the plant equipment in response to process sensors 101C while achieving the described objectives. In this instance an automatic startup control for the steam tubine 36 is largely embodied in the monitor computer 100C. An operator panel 102C provides numerous pushbutton switches and various displays which make it possible for the plant to be operated by a single person. The pushbutton switches provide for numerous operator control actions including plant and turbine mode selections and setpoint selections.

In the operator analog or manual mode of operation, the operator sets the fuel level for the gas turbines 12 and 22 and the afterburners 16 and 26 through gas turbine controls 104C and 106C during loading, but an analog startup control included in each of the gas turbine controls 104C and 106C automatically schedules fuel during gas turbine startups. In addition, sequencers 108C start and stop auxiliary equipment associated with the gas turbines during gas turbine startups. The turbine bypass steam flow and the turbine inlet steam flow are controlled by operator valve positioning implemented by a steam turbine control 110C during steam turbine startup and loading in the operator analog mode. Certain automatic control functions are performed for the steam and gas turbines by the controls 104C, 106C and 110C in the operator analog mode.

In the operator automatic mode, the computers 58G and 100C perform various control functions which provide for automatic startup and automatic loading of the gas and steam turbines under the direction of the operator on a turbine-by-turbine basis. Afterburner controls 112C and 114C and boiler controls 116C and 118C operate under operator setpoint control during the operator analog and operator automatic modes. Respective digital/analog hybrid circuits 120C, 122C and 124C interface the digital and analog controls.

Under plant coordinated control, the computer 58G generally directs the plant operation through startup, synchronization and loading to produce the plant power demand. The extent of coordinated plant control is dependent on the existing plant configuration, i.e. according to the availability of apparatus for operation or for coordinated operation. For example, if a gas turbine is shut down, it is excluded from coordination. Similarly, if the gas turbine has been excluded from coordinated control by the operator, the computer 58G will operate accordingly. In all coordinated control cases, the boiler control 116C and 118C function separately, i.e. they react automatically to operator setpoints and signals generated by the process sensors 101C to control the steam generators according to plant conditions produced by coordinated turbine and afterburner operations. The computer 58G provides setpoint signals for the afterburners in the coordinated control mode but not in the operator automatic mode. Coordinated control provides the highest available level of plant automation, and the operator automatic and operator analog modes provide progressively less automation. Some parts of the analog controls function in all of the plant modes.

Generator synchronization is performed by a synchronizer 126C under operator control or under computer control in the coordinated mode. Generally, the respective generators are sequenced through synchronization by switching actions applied to the synchronizer inputs and outputs.

Once the plant reaches hot standby and either gas turbine or both gas turbines have been started, the steam turbine can be started when minimum steam supply conditions have been reached. Thereafter, the turbines are accelerated to synchronous speed, the generators are synchronized and the fuel and steam valves are positioned to operate the turbines at the demand load levels. The manner in which the control system 50 is configured and the manner in which it functions throughout startup and loading depends on the selected plant mode and the selected or forced plant configuration and the real time process behavior.

D. Electrical Overspeed Protection System

Figure 4A:
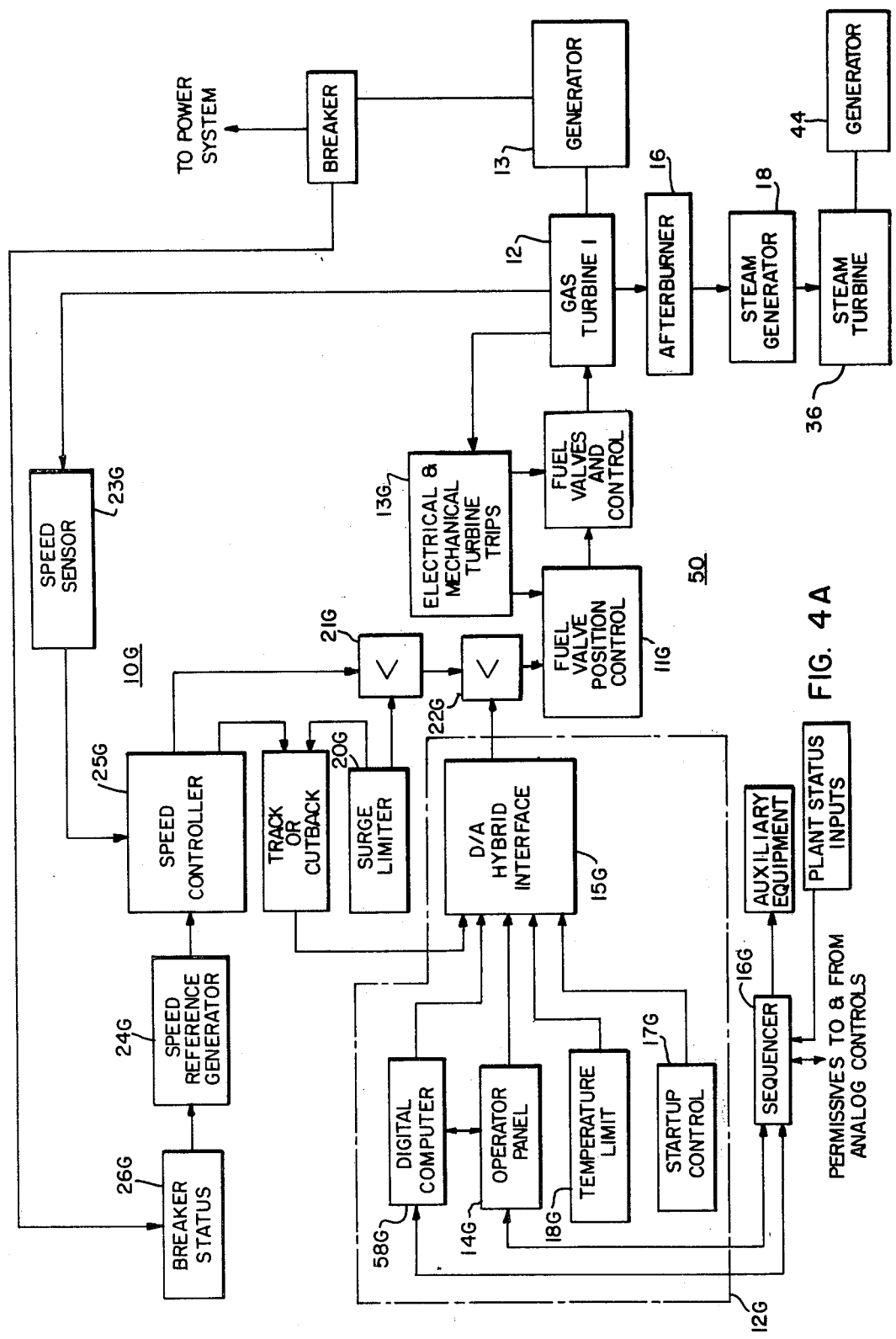
FIGS. 4A and 4B show a schematic diagram of the plant control system with elements of an electrical overspeed protection valve control illustrated to indicate more particularly the preferred manner of embodying the invention.

As shown in FIG. 4, the preferred embodiment comprises an electrical overspeed protection system 10G which is included in the plant control system 50 to limit turbine overspeed reliably and efficiently during both the automatic and the manual modes of operation. Gas turbine speed is limited by imposing a limit directly on a throttle valve position control 11G independently of a speed load control 12G.

Figure 4B:
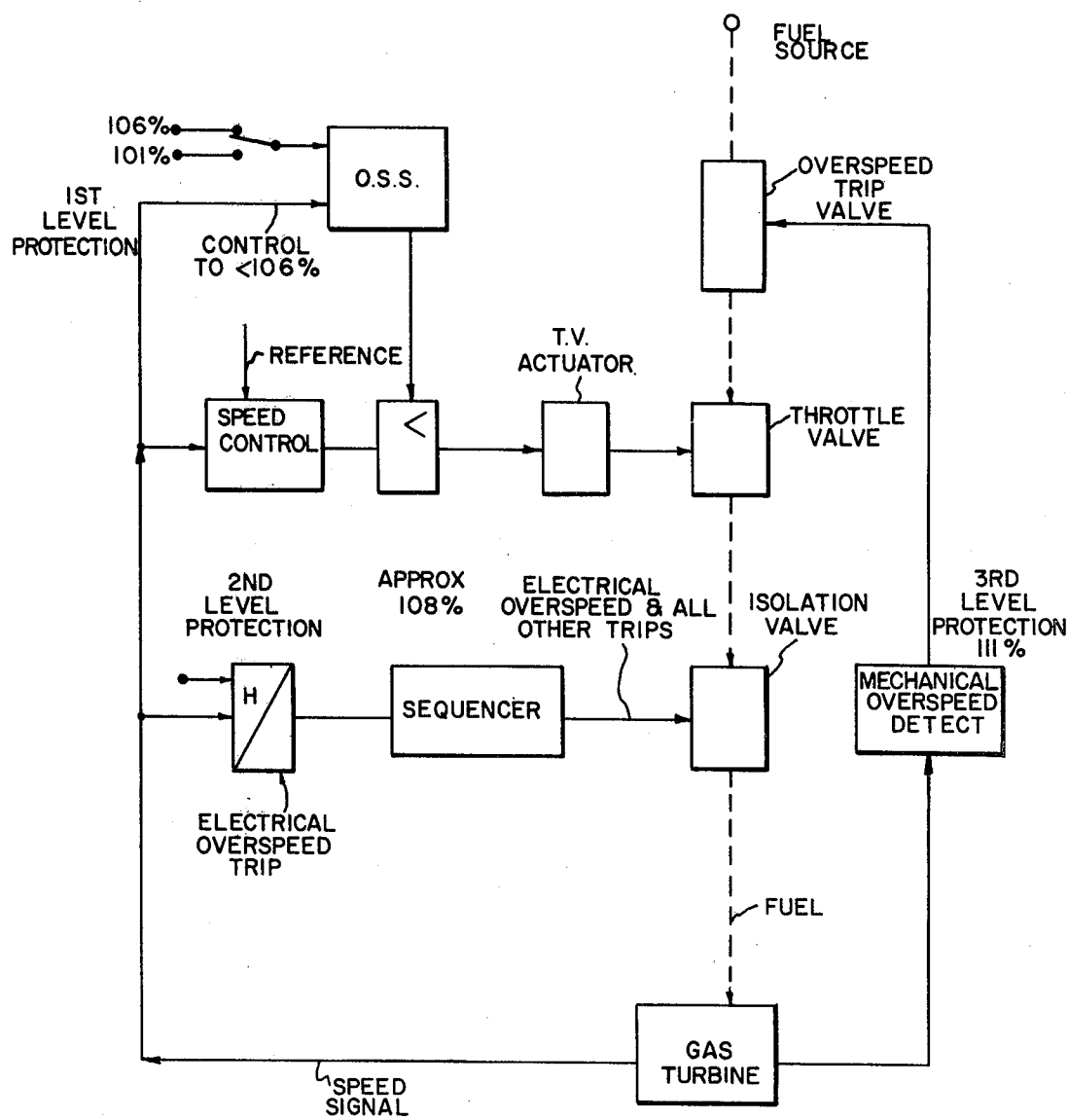

The electrical and mechanical turbine trip apparatus 13G provides backup overspeed protection to prevent turbine speeds in excess of predetermined values such as 180% and 111% of rated speed respectively. When the trip apparatus 13G senses an overspeed condition, a trip valve or a fuel isolation valve is directly closed by the trip action to shut off the fuel flow, and the valve position control 11G is operated to drive the throttle valve to a closed position. As previously described, electrical overspeed protection with fuel limit action provides a first line of defense against turbine overspeed to avoid turbine trips in instances where the turbine operating conditions do not require a shut down for overspeed protection. In FIG. 4B, the relationship of the different levels of overspeed protection is illustrated by means of a more detailed showing of the fuel supply system and the ties of the protection controls to the valves in that system.

The manual/automatic status of the plant control system 50 is fixed by operator selection at an operator panel 14G or by a computer rejection to manual. A digital/analog hybrid interface 15G includes manual/automatic logic circuitry to detect when the gas turbine 12 is to be on backup or manual control and to make switching operations which implement the applicable control mode.

A programmed digital control computer 58G generates a fuel reference from the hybrid 15G in the coordinated and the operator automatic modes during speed and load control, and it initiates turbine startup by a sequencing system 16G under coordinated control. Generally, the sequencer 16G sequences the gas turbine 12 through the startup process by starting and stopping auxiliary equipment when sequencing permissives are generated, and it trips the turbine if certain conditions develop. Further, the sequencer 16G generates logicals for the turbine controls, i.e. a master relay on signal, a fuel on signal, a breaker status signal generated by sensor 26G, a fuel select and transfer signal, and a flame on signal.

In the operator analog or manual mode, the operator controls the turbine loading operation by generating a fuel reference from the hybrid interface 15G, and a startup control 17G generates a fuel reference from the hybrid interface during startup. A temperature limit control 18G functions during the operator analog or manual mode to limit the turbine blade path or exhaust temperature by imposing a limit on the fuel reference.

As in the case of the turbine overspeed protection system 10G, a surge limit control 20G functions in all modes of operation directly through the fuel valve position control 11G to limit the hybrid fuel reference for the purpose of avoiding surge conditions. As shown in FIG. 4, a low select function 21G transmits the lowest of the surge and overspeed protection limit signals as a limit on the hybrid fuel reference. A low select function 22G imposes a limit on the hybrid fuel reference by transmitting the lowest of the limit signals from the low select function 21G and the hybrid fuel reference to the throttle valve position control 11G.

During startup, the turbine is accelerated through ignition speed to synchronous speed under control of the computer 58G or the analog startup control 17G and the sequencer 16G. The generator 13 is then synchronized to the line and the breaker is closed and the turbine is loaded by further increases in the fuel flow. Turbine overspeed can occur with the breaker closed if the system frequency rises, or it can occur with the breaker open.

In the operation of the overspeed protection system 10G, the speed/load control 12G generates a fuel reference during startup and in this case without frequency participation during load operation. The turbine is accelerated under backup control to synchronous speed by a feedforward ramp fuel reference without speed feedback correction and once synchronization occurs the turbine speed is regulated by the system frequency. In the automatic mode, a speed feedback control is employed in the computer 58G during startup.

A turbine speed signal generated by a sensor 23G and an overspeed reference generated by block 24G are compared in the automatic mode or the backup mode, and a speed controller 25G generates a speed limit signal. Since the overspeed reference is a higher value during load operation to permit full turbine loading, it is switched to a lower value sufficient to permit gas turbine idling when the breaker is open and to reduce the speed increase bump when the breaker is tripped and the turbine load is dropped.

Normally, if the gas turbine speed exceeds the overspeed reference and if surge is not more limiting, the overspeed limit signal directly causes a reduction in the fuel reference signal at block 22G without the response delay inherent in the functioning of a speed/load control which includes a speed control for operation during the startup mode and/or the load mode with frequency participation. The speed/load control is kept relatively simple and reliable in the manual mode without need for speed feedback control, and electrical overspeed protection is reliably, directly and quickly provided independently of the speed/load control during all operating modes. Unnecessary and costly turbine and combined cycle plant shut downs are thus avoided as turbine overspeed protection is reliably provided. Further, unnecessary turbine speed increases are avoided during the course of turbine overspeed protection as a result of the rapid functioning of the direct electrical overspeed protection and the reduction of the overspeed reference upon the opening of the breaker. Accordingly, unnecessary apparatus stress cycle due to cycling in the steam generator temperatures and the inlet steam turbine temperatures are avoided by the responsiveness of the gas turbine overspeed protection system as needed overspeed protection is provided.

SYSTEM FUNCTIONS

Figure 6B:
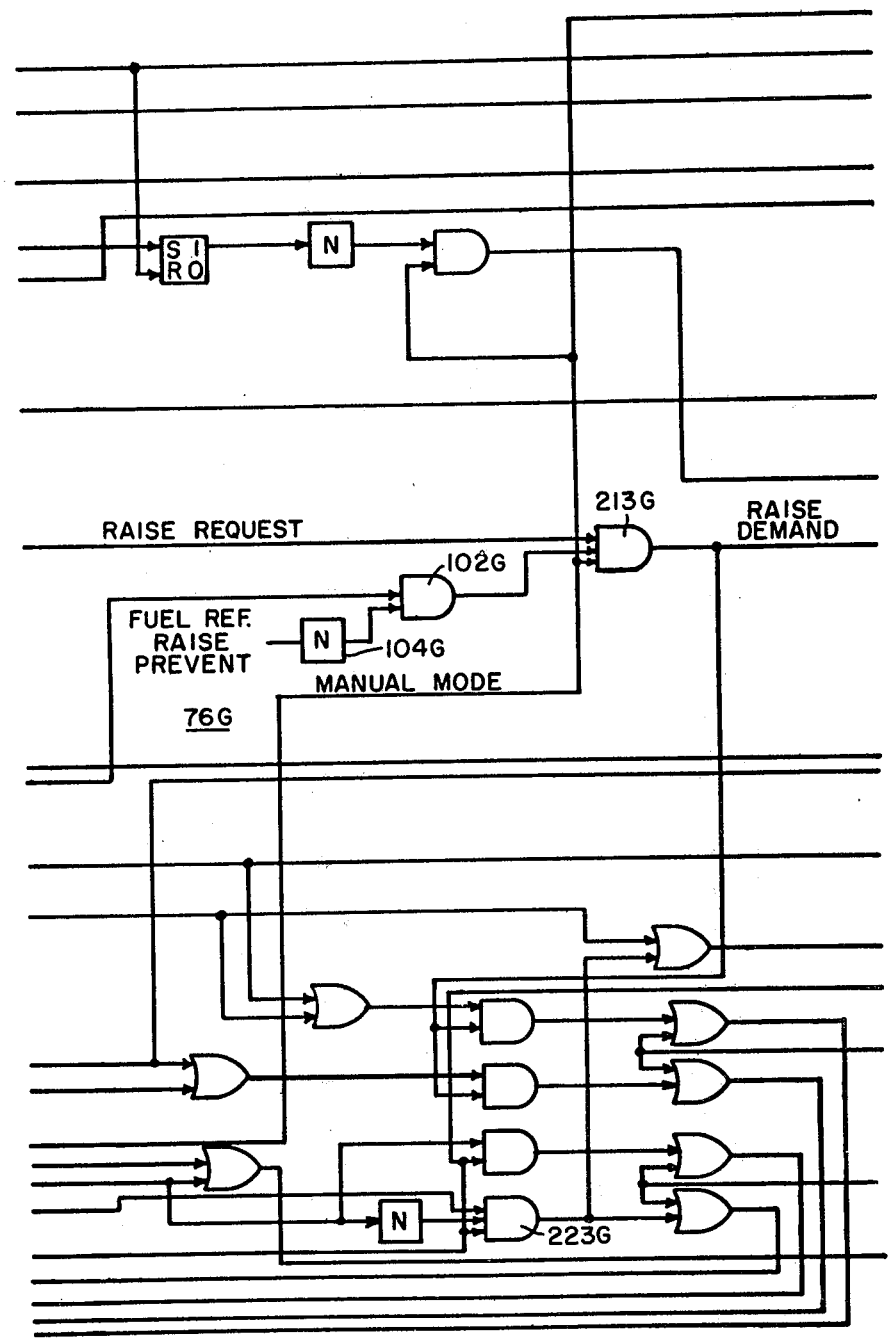
Figure 6C:
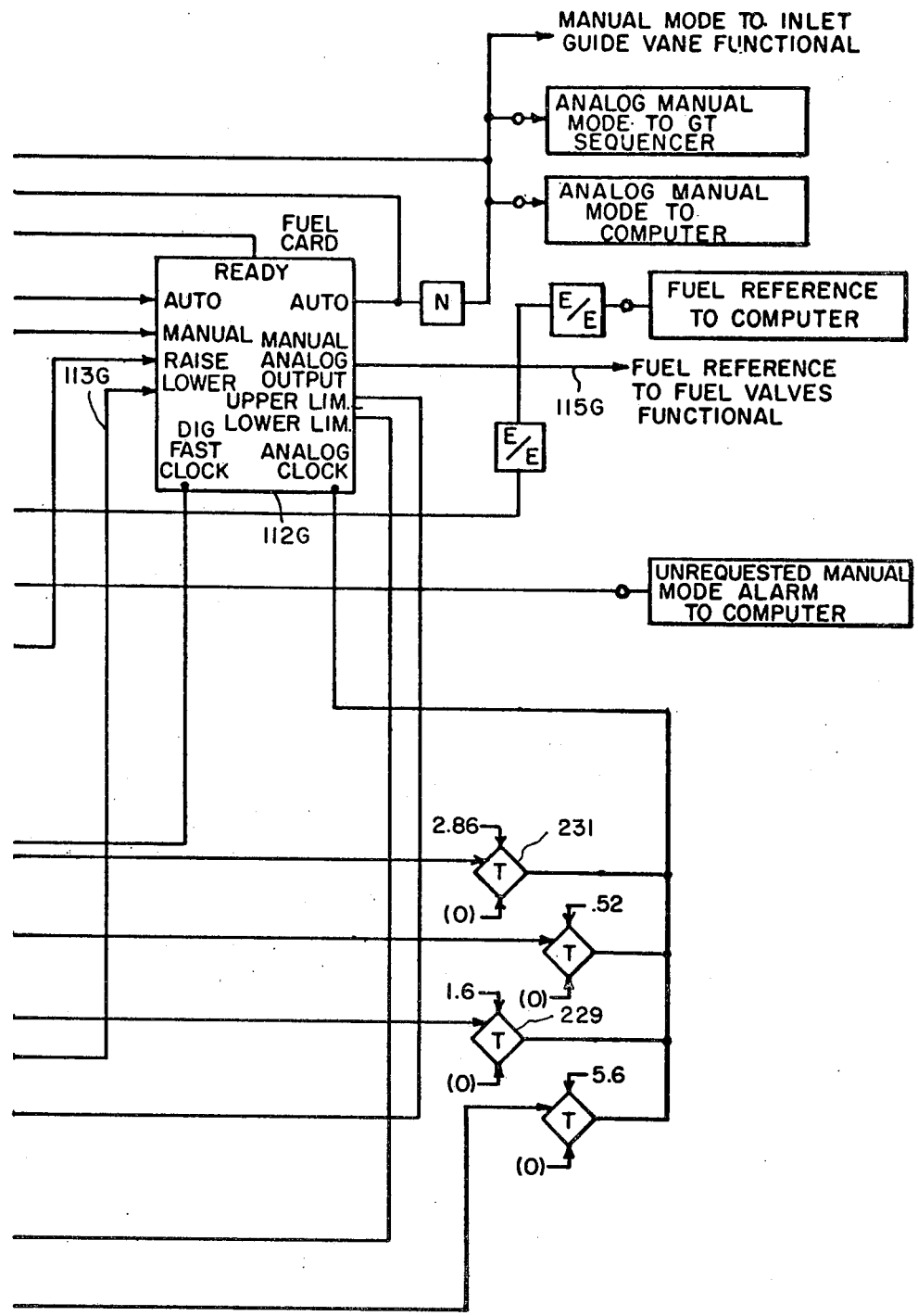

As shown in more functional detail in FIGS. 6A-6C, a fuel reference is generated by the NHC hybrid interface card 112G as indicated by the reference character 115G. Fast and normal raise and lower pushbuttons 212G, 214G, 216G and 218G in box 100G on the operator panel function through RAISE AND and OR blocks 213G and 215G and LOWER AND and OR blocks 108G and 106G to apply inputs to the NHC card 112G which enable the fuel reference to be raised or lowered in the operator analog and manual modes. The normal raise and lower pushbutton signals are also applied to AND blocks 221G and 223G to set a normal ramp through the NHC analog clock for as long as the pushbutton is depressed. Similarly, fast raise and lower signals generate a fast ramp through AND block 225G and OR block 253G. Switches 229G and 231G are operated to generate the normal and fast ramp control signals. In the automatic mode, the computer 58G applies signals to the NHC card 112G to generate the output fuel reference from the NHC card 112G.

The automatic mode is selected by a pushbutton 220G if a computer READY signal is received from the NHC card 112G. The system functions in the manual or operator analog mode if a manual pushbutton 222G is pushed or if the computer rejects to manual as indicated by boxes 224G and 226G. Generally, the NHC card 112G responds to the automatic and manual mode signals to interface the manual mode control loops with the automatic mode control loops and to couple these loops with continuously functioning downstream control loops and the downstream fuel valve control.

Figure 6D:
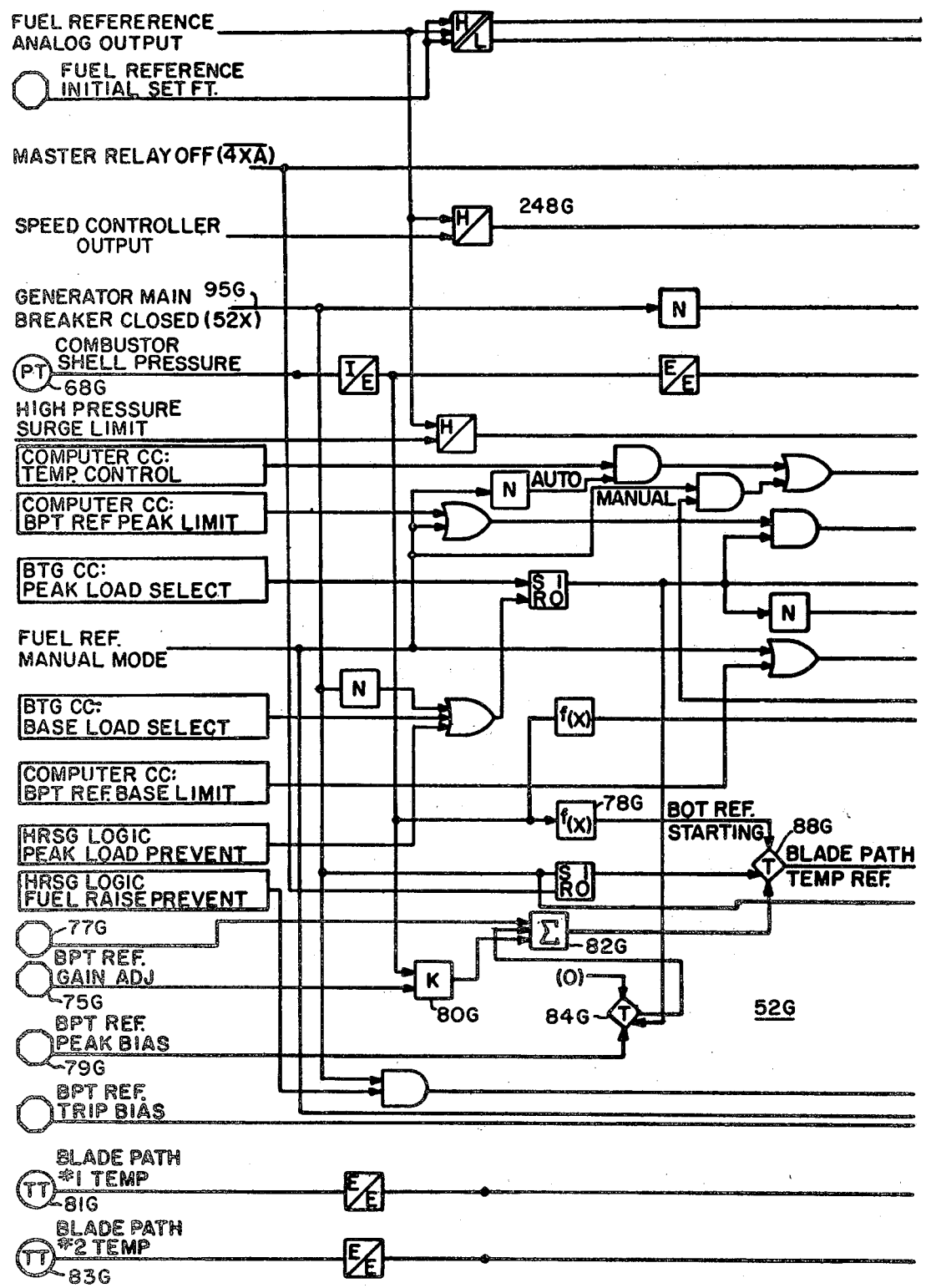
Figure 6F:
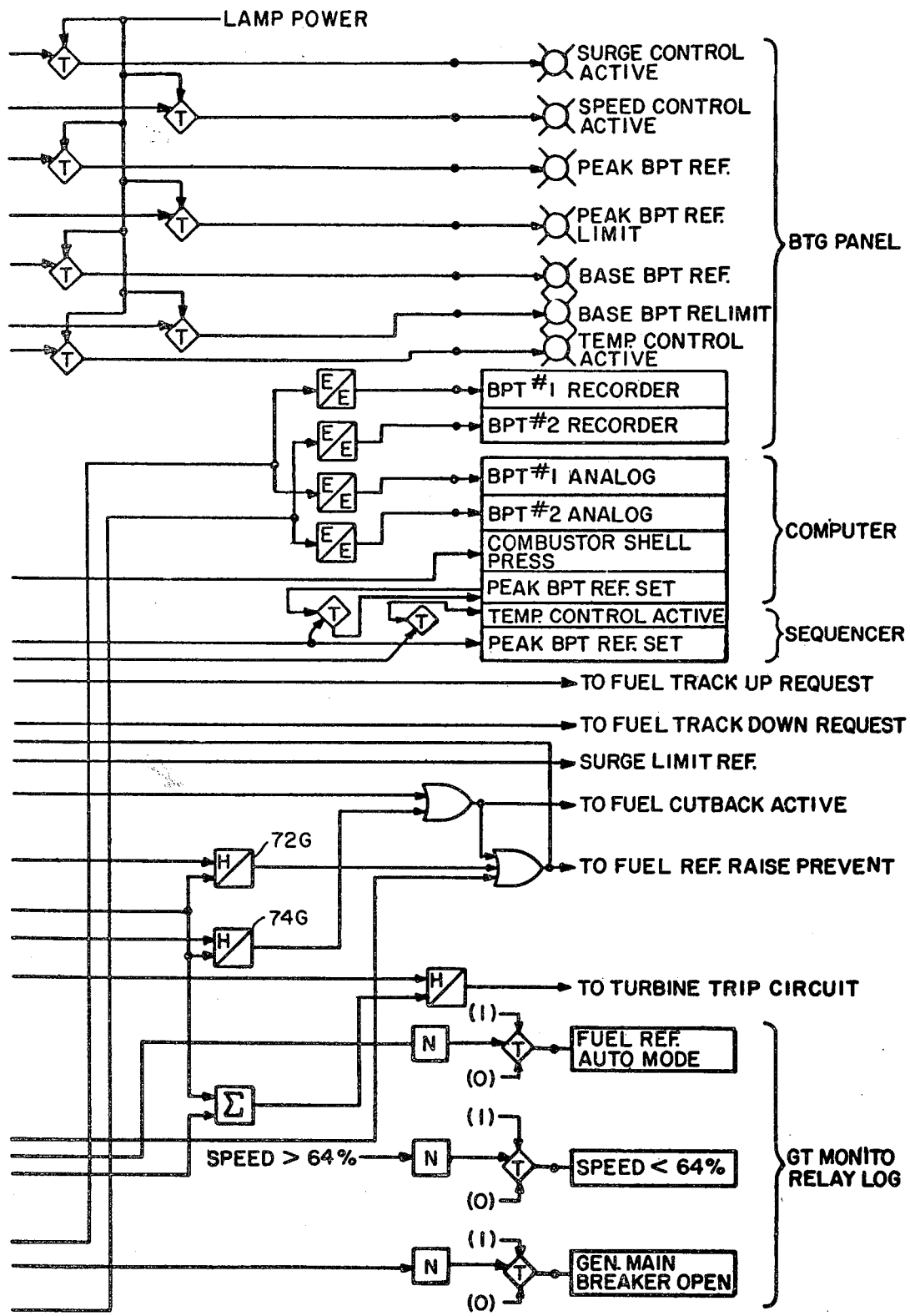
Figure 6G:
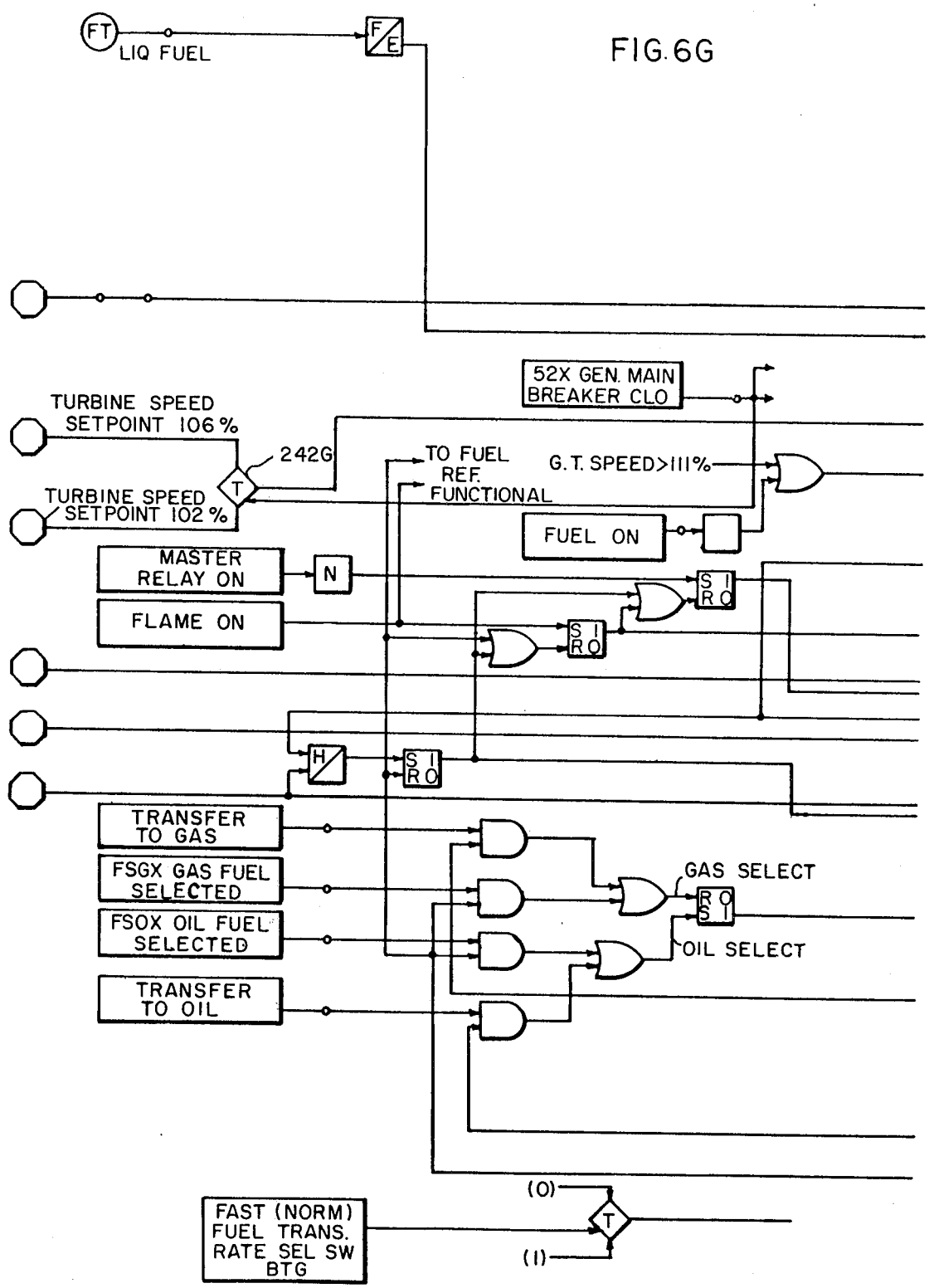
Figure 6H:
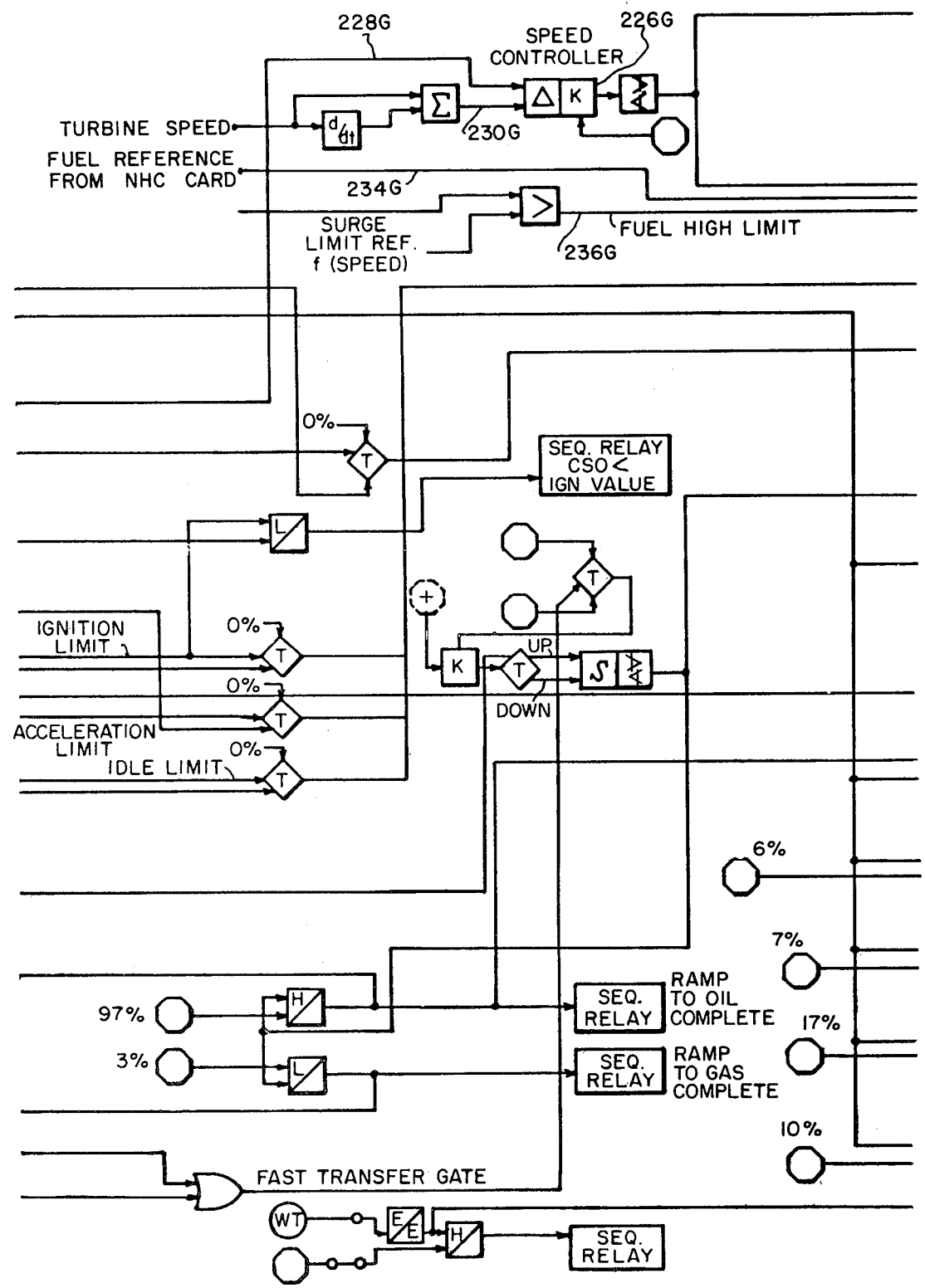
Figure 6I:
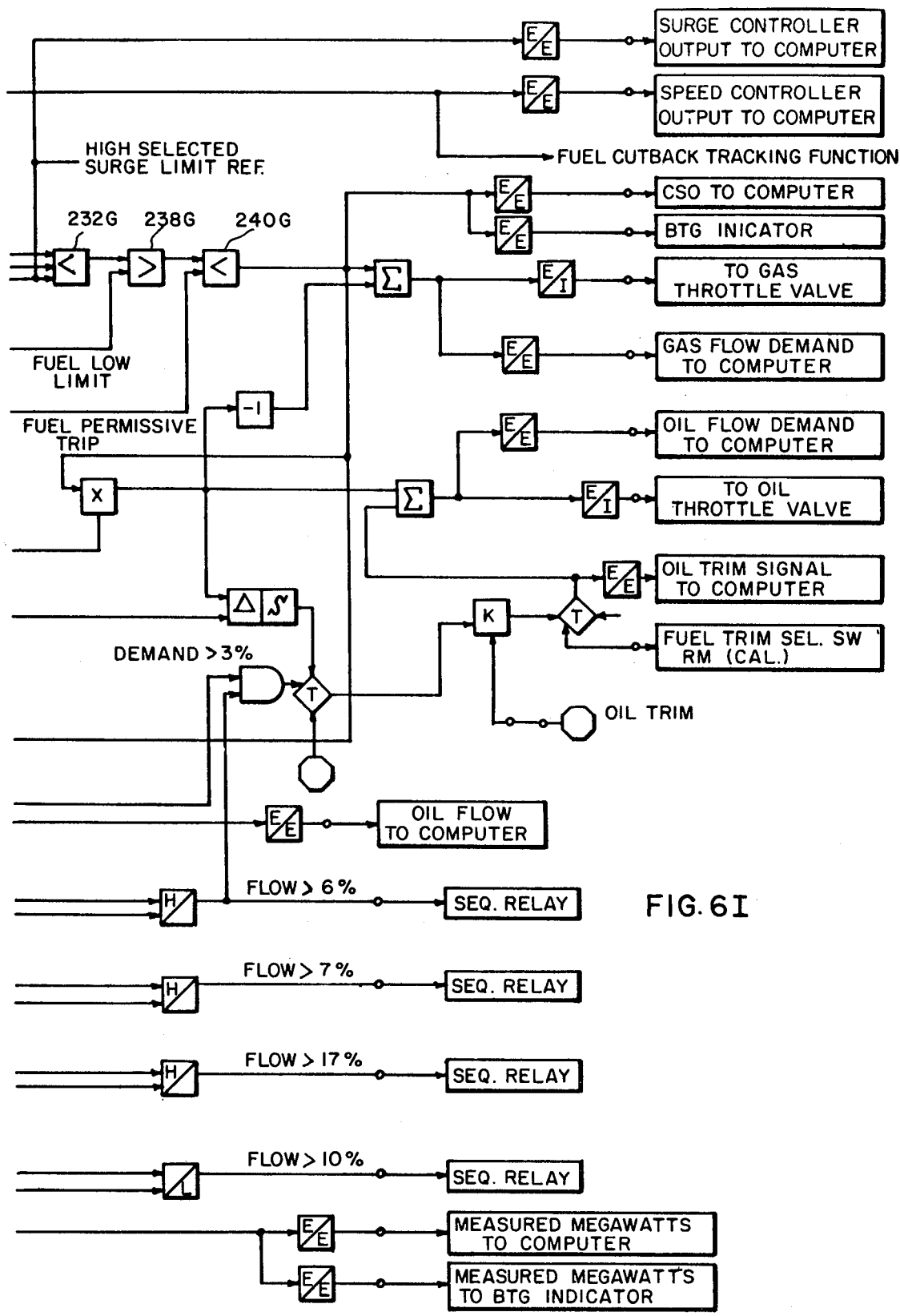

As shown in FIGS. 6G-6I, the electrical overspeed protection system 10G includes a proportional controller 226G which compares a turbine speed setpoint of 102% or 106% as indicated by the reference character 228G with a signal representing the sum of the actual speed and, for purposes of quick corrective response to speed errors, the derivative of the actual speed as indicated by the reference character 230G. The proportionality constant of the controller can be varied to vary the regulation from 2% to 8% as indicated in the drawing. The output of the speed controller 226G is checked for high and low limits and applied to a low selector 232G along with the fuel reference from the NHC card 112G as indicated by the reference character 234G and an output from the surge limiter indicated by the reference character 236G. The smallest of the three input signals is selected by the low selector 232G and generated at its output. A high selector 238G prevents the fuel reference from falling below a value required for avoiding outfire, and a low selector 240G prevents the fuel reference from exceeding a predetermined high limit value. The output fuel reference signal is then applied to a fuel transfer control and ultimately as a position reference the gas and oil throttle valve controls.

Figure 5:
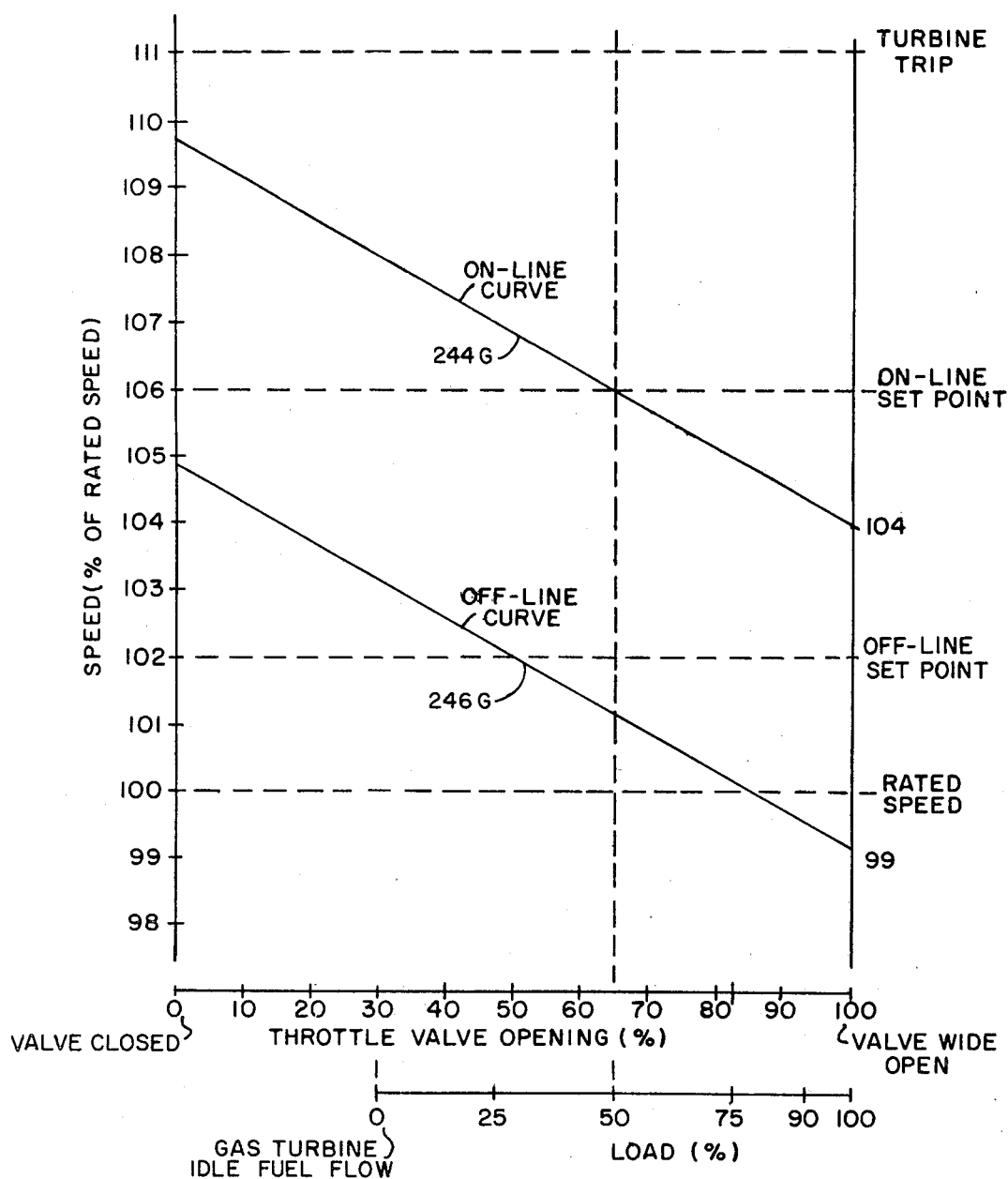
FIG. 5 shows a speed/load characteristic for the gas turbine employed in the combined cycle power plant.

As illustrated in FIG. 5, the speed reference is 106% rated speed when the breaker is closed to enable the speed error to be sufficient to allow 100% loading in the load mode. The speed reference is 102% when the breaker is open to allow closer overspeed protection during startup and during idling operation. Upon the opening of the breaker, a switch block 242G switches the speed reference from 106% to 102% to obtain an immediate fuel cutback directly through the speed controller 226G and thereby to reduce the speed bump on a load dump.

In order to track the actual fuel reference signal when the overspeed protection loop becomes active, the NHC fuel reference output is compared with the speed controller output in a high signal monitor 248G (FIG. 6D). If the fuel reference is higher than the speed limit signal, a fuel reference track down signal is generated by an AND block 250G through an OR block 252G and applied to the OR block 253G (FIG. 6A) to set a fast analog fuel lower rate through the NHC clock and to cause a cutback in the NHC fuel reference through the OR block 106G. The fuel reference lower track down signal also operates as a digital or logical trigger for fast clock operation in the NHC card 112G.

A track down signal from the OR block 106G causes a cutback demand to be generated by the AND block 108G if the system is in the manual mode. If the system is in the automatic mode, similar tracking occurs through the computer 58G to cause the NHC fuel reference output to track the speed limited fuel reference.

The NOT block 110G processes the track down output of the AND block 108G to generate the lower signal in the NHC card 112G as indicated by the reference character 113G. The output of the AND block 108G is also coupled to display logic to indicate any track down activity. Accordingly, when the electrical overspeed protection loop becomes active to limit the fuel reference applied to the throttle valve control, the output fuel reference from the NHC card 112G is caused to be tracked down to the current value of the speed limited fuel reference. In this manner, a return can be made to automatic or manual NHC card control in a bumpless manner when the overspeed control loop becomes inactive with a drop in turbine speed below the limit value.

DIGITAL/ANALOG HYBRID COUPLER (NHC) CARD

Figure 8:
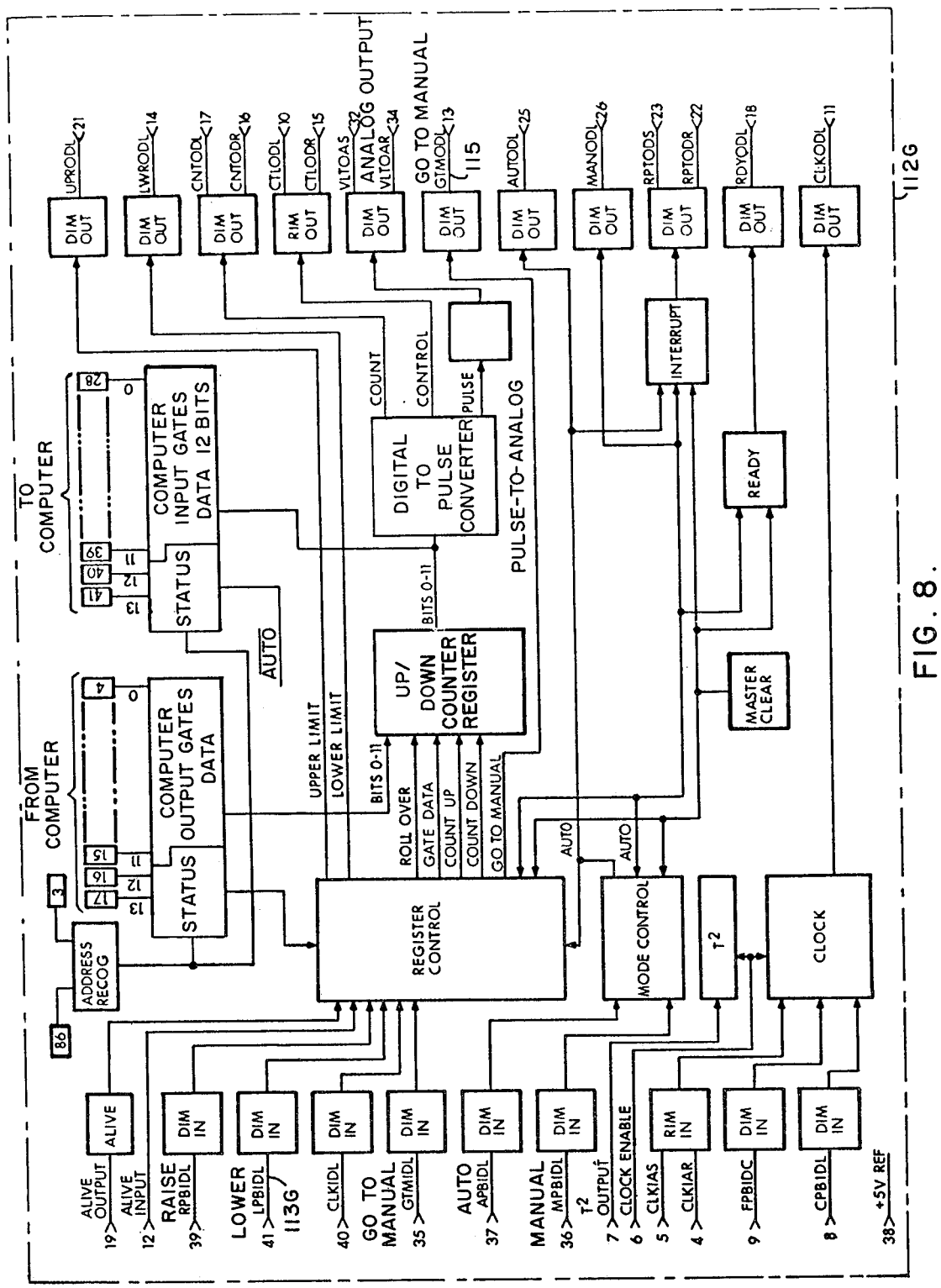
FIG. 8 shows a schematic diagram of a circuit card which provides a hybrid interface between the digital computer circuitry and the analog circuitry employed in the gas turbine control system.

As shown in greater detail in FIG. 8, the fuel reference raise and lower signals are applied to the input of an HNC register control which causes an up/down register to count up or count down according to whether a raise demand or a lower demand is in effect. On hold operation, an operator raise request is defeated, and on a cutback operation or a track down operation, a fuel reference lower demand is generated at the input of the register control to cause the register to count down. The register output is converted to pulses which in turn are converted to an analog output for application as a fuel reference to the fuel valve control as indicated by the reference character 115G.

An NHC card (FIG. 8) converts a 12 bit binary number from the computer to an analog output signal. This card operates in either the manual or the automatic mode. In the automatic mode, the NHC card output can be set or read by a computer peripheral channel. In the manual mode, the NHC card output is controlled by signals generated outside the computer which raise or lower the output.

In automatic operation, if the computer does not update the NHC card within a set time period, the card is set to the manual mode by an alive circuit. The alive circuit has a timing device which can be set for 1, 5, or 20 seconds. The time period is selectable by resistor and capacitor values.

In manual operation, clock pulses determine the rate of change of the analog output signal. The clock pulses may be generated by either an external or an internal clock.

Automatic Operation

The computer uses a 14 bit word to send and receive data and status. When the address recognition circuit senses that the computer is addressing the NHC card, it gates the data and status bits through the output gates. The status bits are routed to the register control and the data bits are routed to the up/down counter. The status bits are decoded and appropriate action is taken. The output of the up/down counter (which contains the last word from the computer) is converted to a pulse train by the digital/pulse converter. The pulse train is then converted to an analog signal. The output of the up/down counter and the status bits are routed to the input gates and sent to the computer.

Manual Operation

In the manual mode, the count in the up/down counter is regulated by external raise (RPBIDL) and lower (LPBIDL) signals generated either by pushbuttons from a manual/automatic control station or by logic circuitry. The clock will increment or decrement the counter as long as the raise or lower signal is present. Roll over is inhibited; that is, the up/down counter cannot count past 4095 or below 0. The clock rate, which is adjustable by analog control, i.e. by means of a variable voltage at pins 4 and 5, determines the amount of time it takes to change the signal level. When the raise or lower signal goes low, i.e. logical zero, the count in the up/down counter is held; thus, the analog output signal remains constant at that level. The D/A register consists of a set of binary up/down counters which accept parallel data and act as latches in the Automatic mode. In Manual mode the operator (or external logic) has control of the counters and can count them up or down. The raise/lower logic and the clock control this process. The raise and lower inputs control which direction the counters move. The counting rate is determined by the clock. If both raise and lower are enabled simultaneously the counters will do nothing.

Manual/Auto Transfer

If forced to Manual mode, the analog output signal remains unchanged at its last value until increased or decreased manually; thus, the transfer is bumpless. The external interrupt alerts the computer to a change in the card's operating mode. It is activated when the card goes from Auto to Manual or from Manual to Auto for any reason. A manual to auto transfer may be initiated only by the operator depressing the "Auto" pushbutton. The card will remain in Manual mode if any internal or external "Go To Manual" signal exists. A "Ready" output indicates that the card is in Manual mode and that no "Go To Manual" signal is present. The card can be forced to Manual by a "Go To Manual" signal. An internal "Go To Manual" is generated by the computer outputting a "Go To Manual" status, by either a "Raise" or "Lower" input, or by the Keep Alive circuit. After an Auto to Manual transition, the last number set in the D/A register by the computer remains until changed by the operator.

SYSTEM CIRCUITRY

Figure 7A:
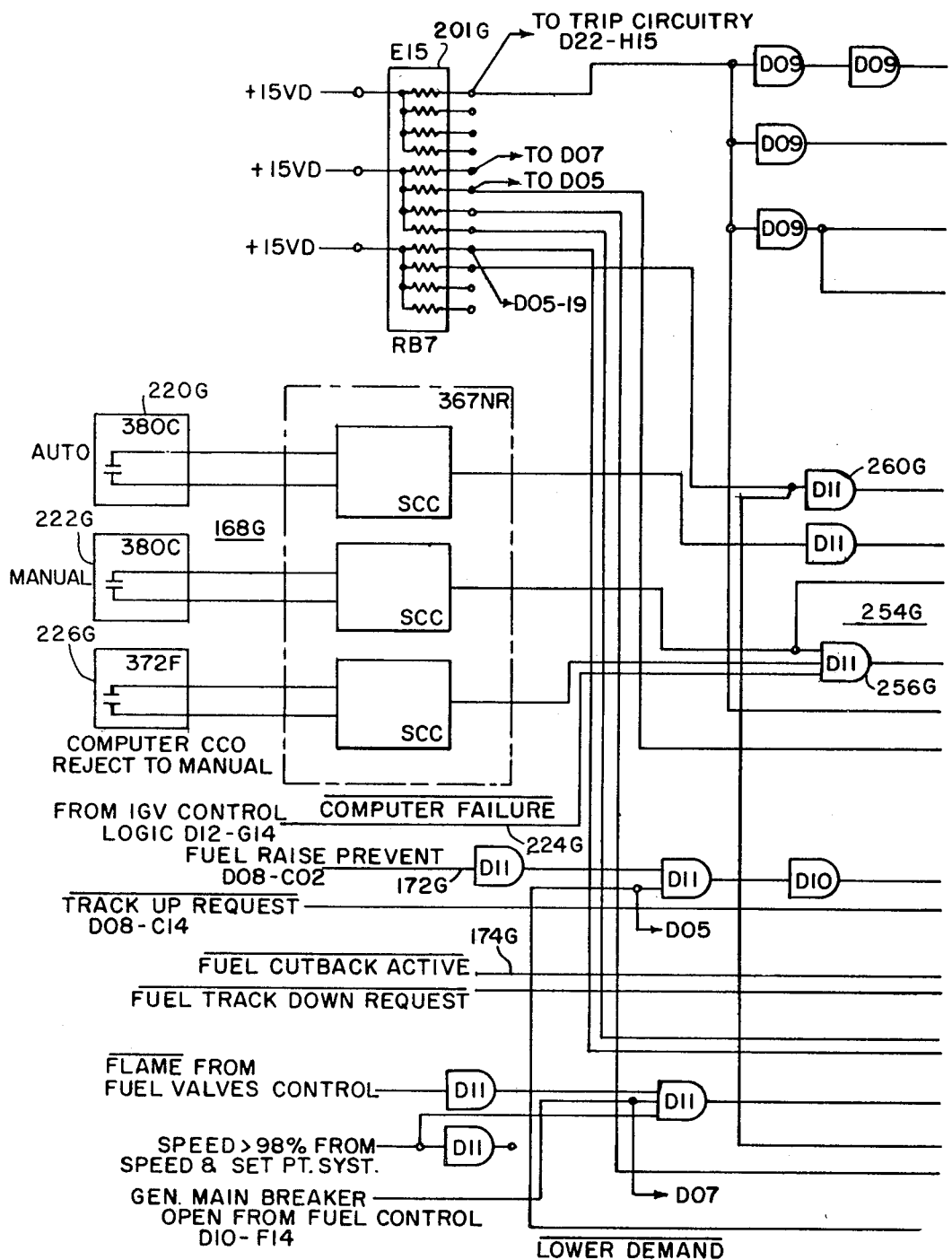
Figure 7B:
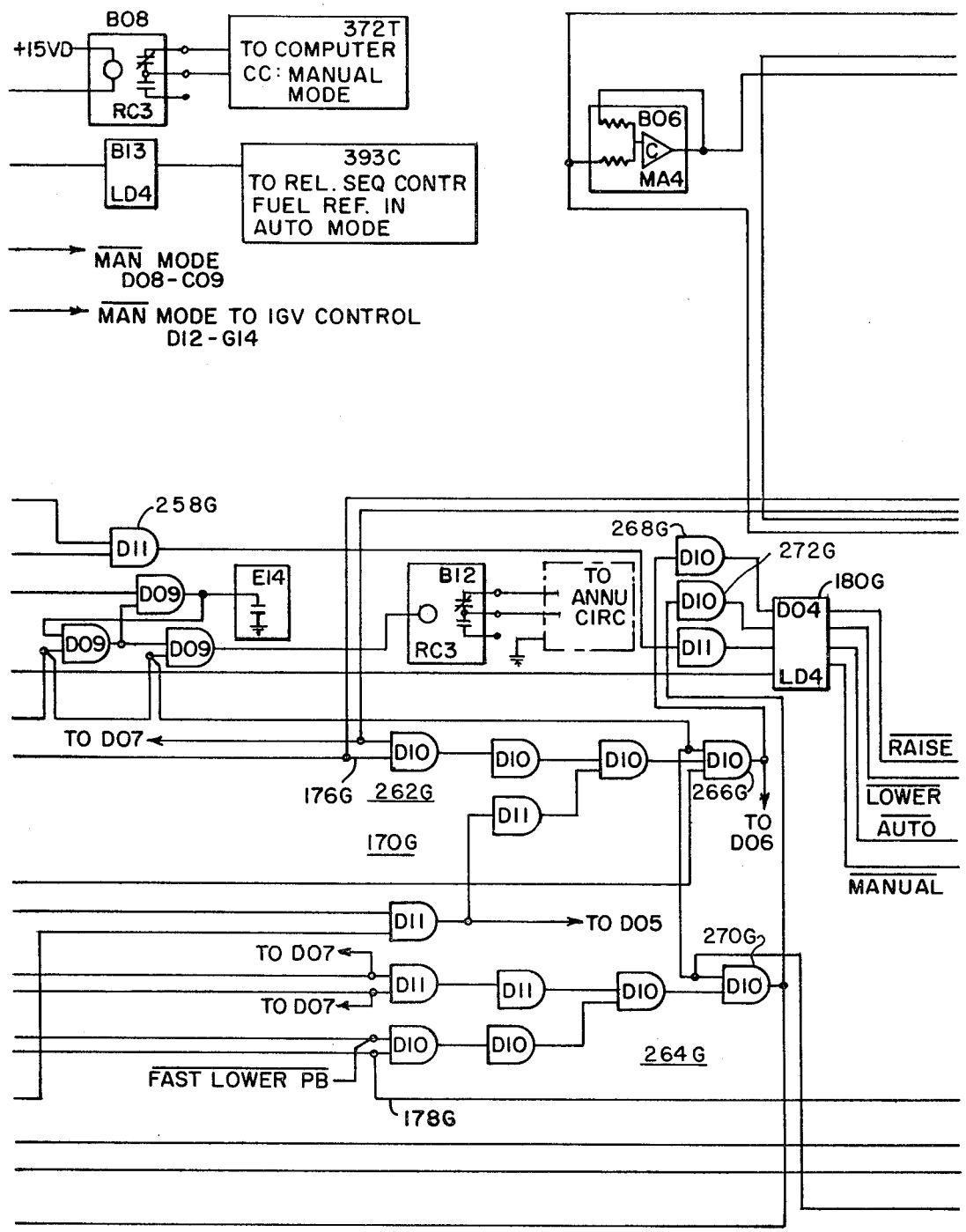
Figure 7C:
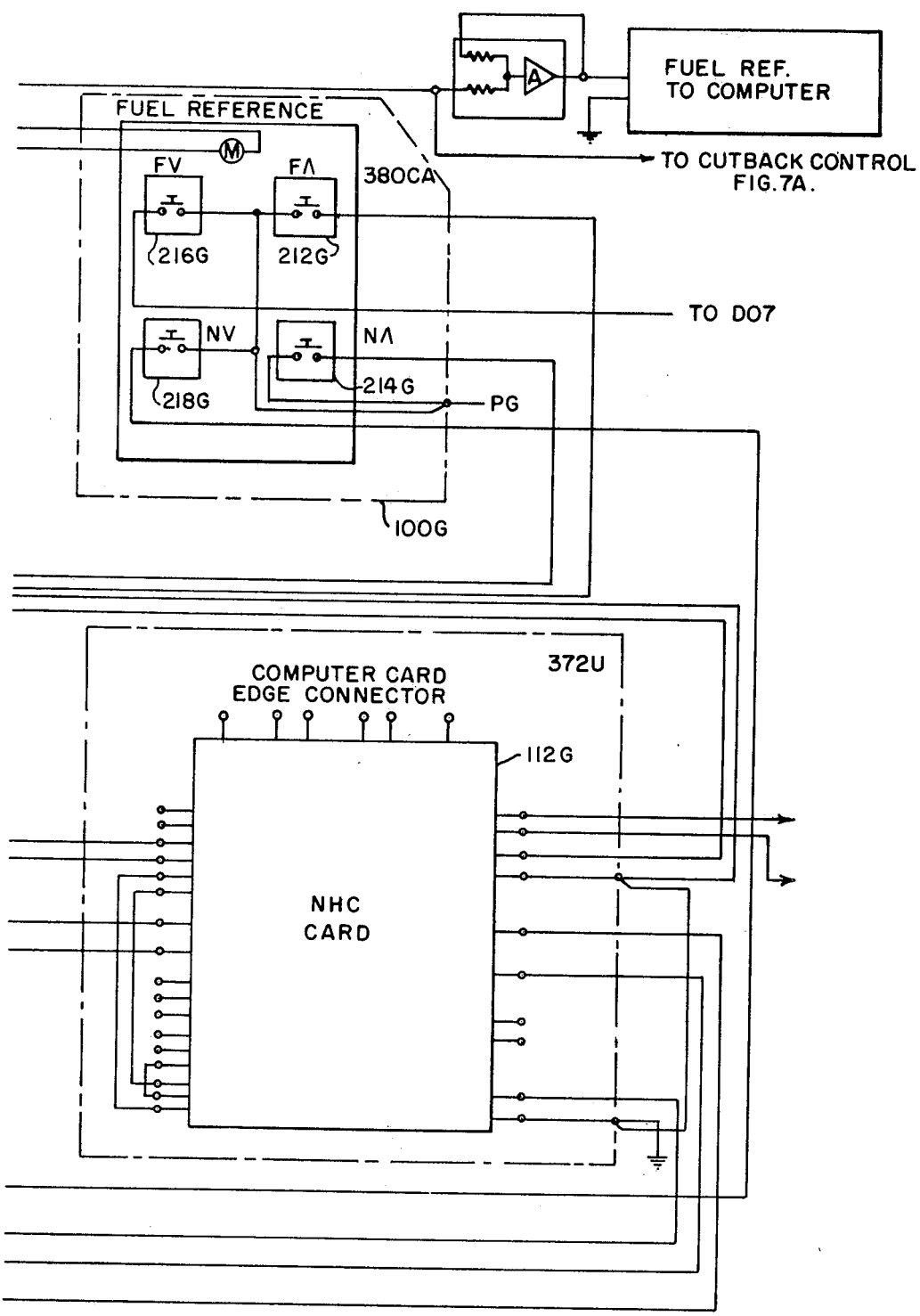

In FIGS. 7A–7I, there is shown circuitry preferably employed to implement functions described in connection with FIGS. 6A–6I. In FIG. 7A, resistors 201G function as pickup resistors to assure proper binary operation of logic circuit elements. To determine the operating mode, the pushbutton and computer reject to manual outputs are applied to mode detection circuitry 254G (FIG. 7A). Thus, AND block 256G generates a manual signal if the manual pushbutton 222G has been operated and the computer has not rejected to manual and the computer has not failed. An AND block 258G generates an automatic mode signal if block 260G indicates the computer is ready for the automatic mode and the automatic pushbutton 220G has been operated. The auto and manual signals are applied to the NHC card 112G, and the manual signal is used for logic and display purposes in various circuits.

The raise and lower pushbuttons 212G, 214G, 216G and 218G generate outputs which are applied to AND logic circuits 262G and 264G respectively. A raise AND block 266G applies a raise signal through AND block 268G to the NHC card 112G if a panel raise request exists or a startup ramp is operative on manual control with a raise permissive (i.e., no fuel hold or fuel cutback in effect). A lower AND block 270G applies a lower signal through an AND block 272G to the NHC card 112G if the fuel cutback channel or the track down channel is active or a panel lower request has been made on manual control.

Figure 7D:
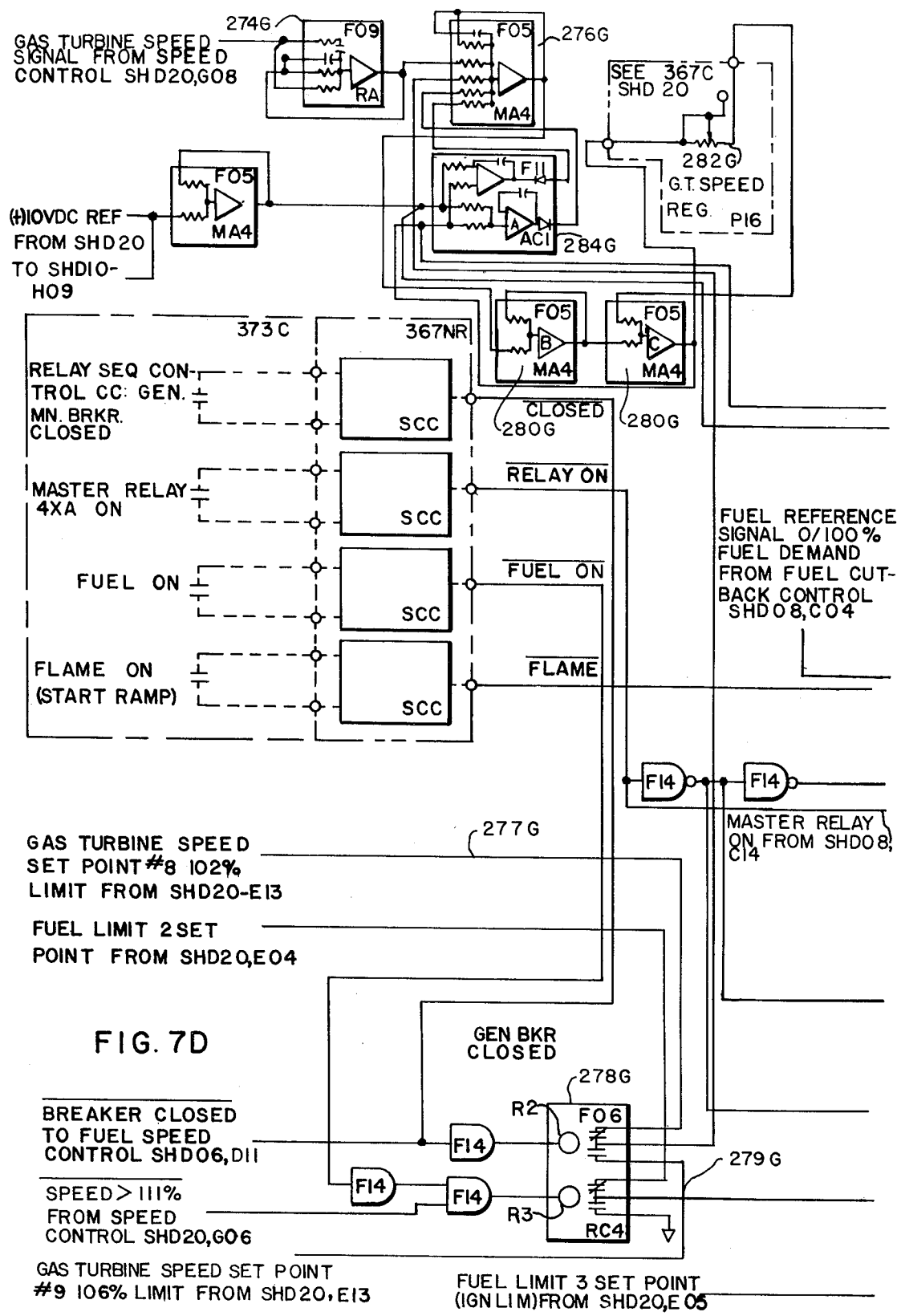
Figure 7E:
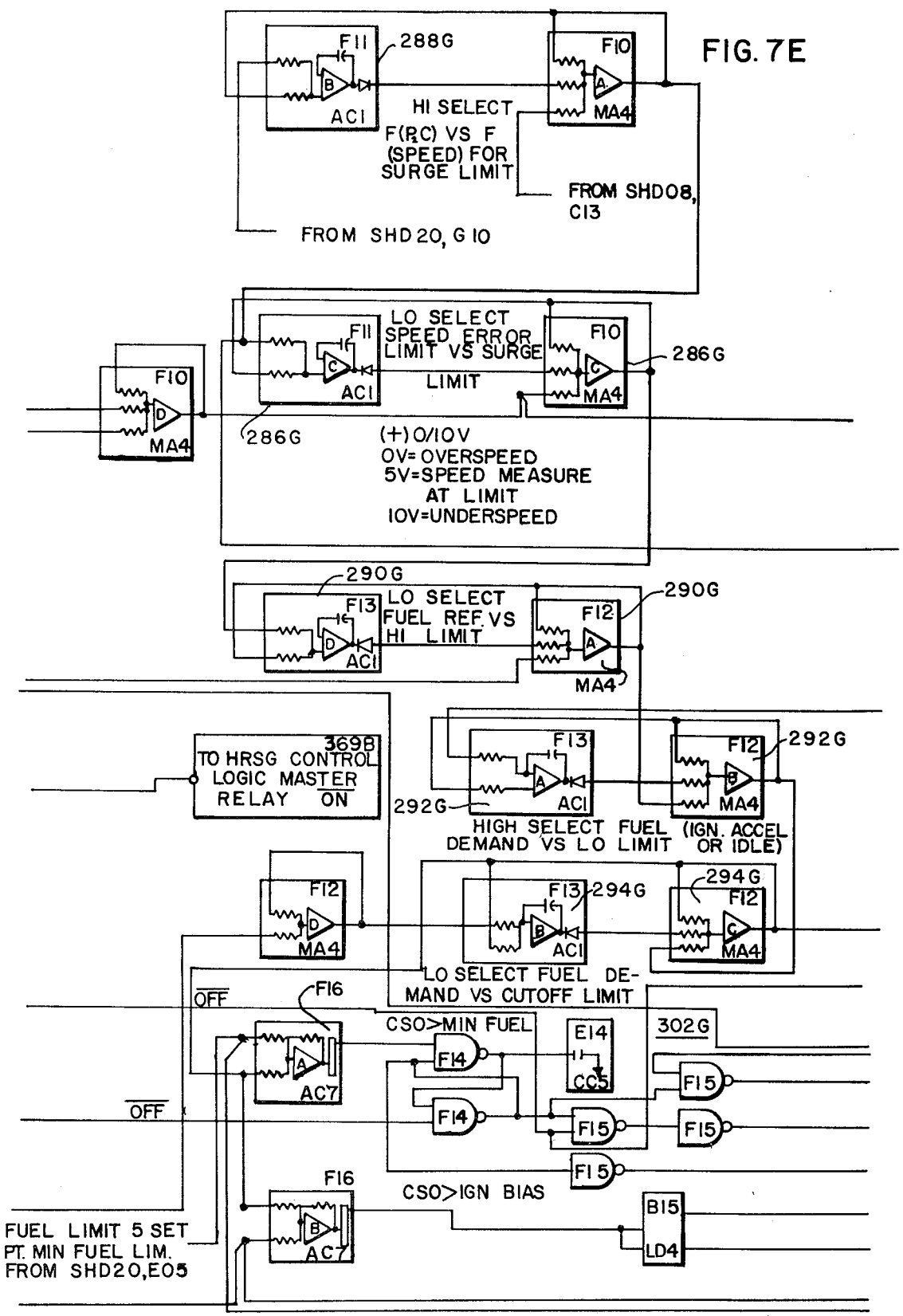
Figure 7H:
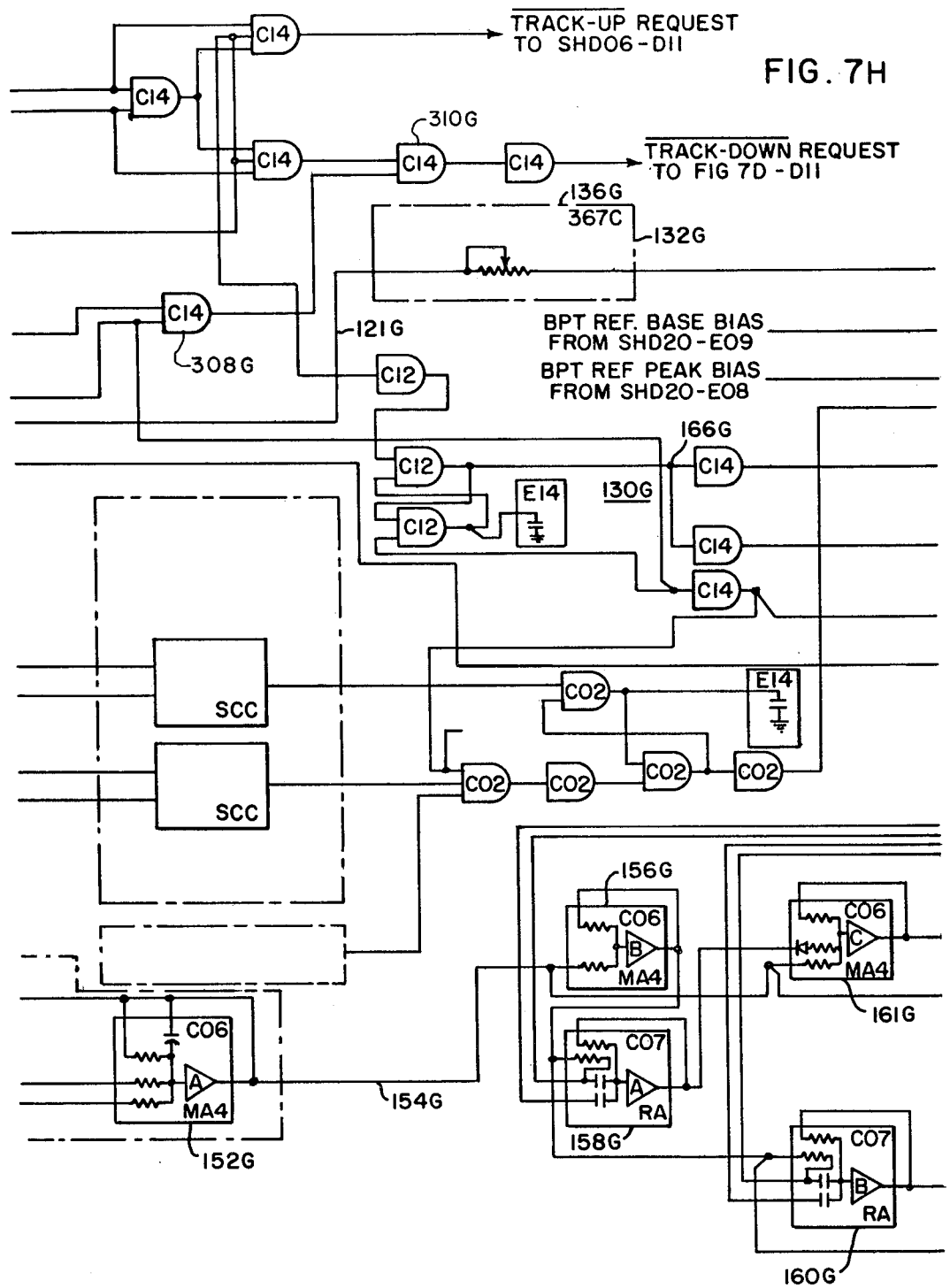
Figure 7I:
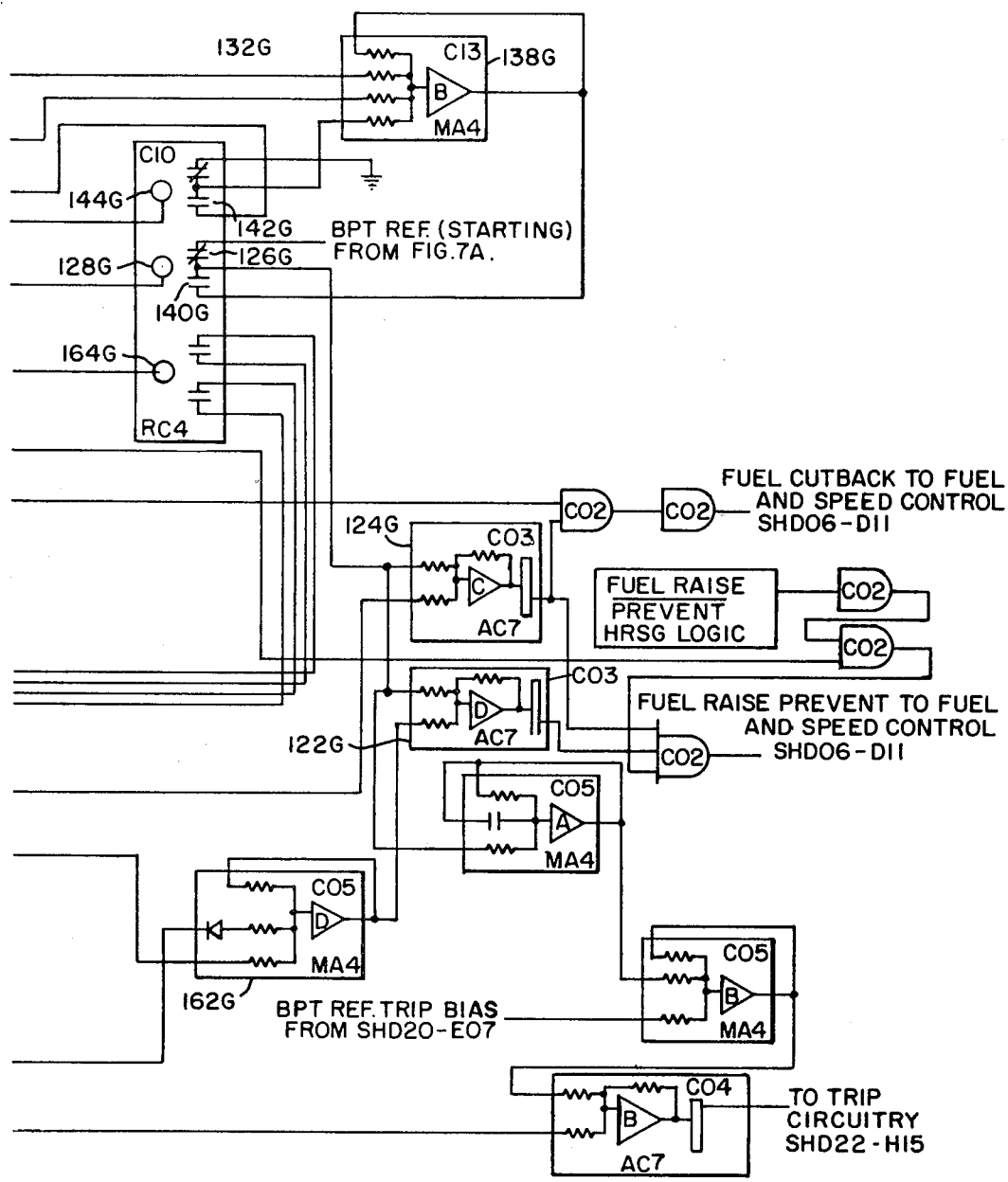

As shown in FIGS. 7D-7F, the overspeed protection system circuitry includes a rate amplifier card 274G which sums the speed feedback signal with the derivative of that signal and generates an output which is applied to the input of a speed controller 276G. If the breaker is open, a relay 278G causes a speed set point voltage corresponding to a 102% speed limit to be applied to the speed controller 276G for summation with the speed feedback signal. The speed controller 276G is provided with output amplifier circuits 280G and a speed regulator potentiometer 282G. A high-low limit circuit 284G operates on the output of the amplifier circuitry 280G to keep the speed limit signal within limits.

A low selector circuit 286G transmits the lowest of the speed limit signal and a surge limit signal from a surge limit control 288G. In a low selector circuit 290G, the lowest of the fuel reference signals from the NHG card 112G and the low limit signal from the low selector circuit 286G is selected and transmitted to a high selector circuit 292G where it is compared with a low fuel reference limit signal; the high selector output is applied to a low selector circuit 294G where it is compared to a high fuel reference limit signal. The low limit signal applied to the circuit 292G is controlled by an ignition limit relay 296G, an acceleration limit relay 298G and a minimum fuel limit relay 300G. Logic circuitry 302G controls the operation of the limit relays.

The output from the low selection circuit 294G is the fuel reference signal which is applied to the fuel transfer and throttle valve position control circuitry. If the gas turbine speed exceeds the applicable speed reference, the speed controller 276G generates an output which functions as a limit on the output fuel reference signal through operation of the low selector circuit 290G.

When the breaker is closed, the relay 278G is operated to remove the 102% speed limit reference 277G from the input of the speed controller 276G. In its place, a 106% speed limit reference is applied as indicated by the reference character 279G.

To provide for NHC tracking of the fuel reference signal if it is subjected to downstream limit action by the overspeed protection system, the output from the speed controller 276G is applied, as indicated by the reference character 291G, to the input of a high signal monitor 306G (FIG. 7G) where it is compared to the fuel reference output from the NHC card 112G. If the speed limit signal is lower than the NHC fuel reference output, and if the breaker is open as detected by an AND circuit 308G, a fuel track down request is generated by an OR circuit 310G. A track down signal is then processed as previously described in connection with FIGS. 7A–7C.

What is claimed is:

1. A combined cycle electric power plant comprising at least one gas turbine, means for generating steam in response to heat energy from said gas turbine, a steam turbine driven by steam supplied to it from said steam generating means, an electric generator driven by said turbine, means for controlling the operation of said turbines and said steam generating means, said controlling means including a gas turbine control system having means for generating an electric fuel reference signal to control the turbine speed and load, at least one throttle valve for said gas turbine, means for controlling the position of said throttle valve to control the flow of fuel to said gas turbine in response to the fuel reference signal from said speed and load controlling means, means for generating an electric signal representative of the turbine speed, means for generating an electric fuel limit signal in response to the speed signal to limit the turbine speed to a predetermined reference value, means for directly coupling the fuel limit signal to said throttle valve position control means to provide relatively fast turbine overspeed protection and protection against unnecessary temperature induced plant stresses, means for shutting off the flow of fuel to trip said gas turbine independently of said valve position control means at a turbine speed value above the predetermined reference speed value, a circuit breaker associated with said electric generator, means for sensing the status of said breaker, means for generating a first reference signal corresponding to a first speed value when the plant breaker is open and for generating a second reference signal corresponding to a second reference speed value when the plant breaker is closed, said fuel limit signal generating means responding to the difference between the speed signal and the generated speed reference signal, and the turbine trip speed being higher than both the first and the second reference speed values.

2. A combined cycle electric power plant as set forth in claim 1 wherein said speed and load controlling means is a feedforward control which functions without speed feedback correction.

3. A combined cycle electric power plant as set forth in claim 1 wherein said speed and load controlling means is a feedforward control which functions without speed feedback correction, said speed and load controlling means generates a fuel reference and said coupling means includes a low selector circuit for applying the lowest of the speed limit signal and the speed and load fuel reference to said valve position control means.

4. A combined cycle electric power plant as set forth in claim 1 wherein said speed and load controlling means is a feedforward control which functions without speed feedback correction, said speed and load controlling means includes an automatic digital computer control and a manual control and means for interfacing the computer and manual controls to generate a fuel reference signal for application to said throttle valve position control means.

5. A combined cycle electric power plant as set forth in claim 2 wherein means are provided for cutting back the fuel reference signal to the value of the speed limiting fuel signal when the latter is lower than the former.

6. A gas turbine electric power plant comprising a compressor section and a turbine section, a plurality of combustors for energizing the driving gas flow for the turbine section, an electric generator driven by the turbine, a gas turbine control system having means for generating an electric fuel reference signal to control the turbine speed and load, at least one throttle valve for said gas turbine, means for controlling the position of said throttle valve to control the flow of fuel to said gas turbine in response to the fuel reference signal from said speed and load controlling means, means for generating an electric signal representative of the turbine speed, means for generating an electric fuel limit signal in response to the speed signal to limit the turbine speed to a predetermined reference value, means for directly coupling the fuel limit signal to said throttle valve position control means to provide relatively fast turbine overspeed protection, means for shutting off the flow of fuel to said gas turbine independently of said position control means at a turbine speed value above the predetermined reference speed value, a circuit breaker included in the plant, means for sensing the status of said breaker, means for generating a first reference signal corresponding to a first speed value when the plant breaker is open and for generating a second reference signal corresponding to a second reference speed value when the plant breaker is closed, said fuel limit signal generating means responding to the difference between the speed signal and the generated speed reference signal, and the turbine trip speed being higher than both the first and the second reference speed values.

\* \* \* \* \*